US008200028B2

(12) United States Patent
Gabso et al.

(10) Patent No.: US 8,200,028 B2
(45) Date of Patent: Jun. 12, 2012

(54) SYSTEM AND METHOD FOR DETECTING EDGES IN A VIDEO SIGNAL

(75) Inventors: Guy Gabso, Ramat Gan (IL); Monica Man Kay Tang, Santa Clara, CA (US)

(73) Assignee: CSR Technology Inc., Sunnyvale, CA (US)

( * ) Notice: Subject to any disclaimer, the term of this patent is extended or adjusted under 35 U.S.C. 154(b) by 1221 days.

(21) Appl. No.: 11/952,661

(22) Filed: Dec. 7, 2007

(65) Prior Publication Data
US 2009/0148062 A1 Jun. 11, 2009

(51) Int. Cl.
*G06K 9/36* (2006.01)
*G06K 9/46* (2006.01)
*G06K 9/40* (2006.01)

(52) U.S. Cl. ........................ 382/232; 382/266

(58) Field of Classification Search .................. 382/199, 382/254, 260–269, 275; 348/412–413, 421, 348/415, 416, 606, 607, 620, 627, 619, 497
See application file for complete search history.

(56) References Cited

U.S. PATENT DOCUMENTS

| | | | | |
|---|---|---|---|---|
| 4,847,682 A * | 7/1989 | Tsinberg et al. | ............... | 348/668 |
| 5,512,956 A | 4/1996 | Yan | | |
| 5,757,977 A * | 5/1998 | Mancuso et al. | ............... | 382/260 |
| 5,819,035 A * | 10/1998 | Devaney et al. | ............... | 709/202 |
| 5,883,983 A * | 3/1999 | Lee et al. | ....................... | 382/268 |
| 6,011,868 A | 1/2000 | van den Branden et al. | | |
| 6,236,763 B1 * | 5/2001 | Wong et al. | .................... | 382/261 |
| 6,259,823 B1 * | 7/2001 | Lee et al. | ....................... | 382/268 |
| 6,466,624 B1 | 10/2002 | Fogg | | |
| 6,539,060 B1 * | 3/2003 | Lee et al. | ................. | 375/240.29 |
| 6,748,113 B1 * | 6/2004 | Kondo et al. | ................. | 382/232 |
| 6,845,180 B2 | 1/2005 | Matthews | | |
| 7,003,173 B2 * | 2/2006 | Deshpande | .................... | 382/261 |
| 7,003,174 B2 * | 2/2006 | Kryukov et al. | ............... | 382/266 |
| 2005/0168644 A1 | 8/2005 | Demas et al. | | |
| 2006/0110065 A1 | 5/2006 | Huang et al. | | |
| 2006/0171466 A1 | 8/2006 | Schoner et al. | | |
| 2006/0171467 A1 | 8/2006 | Schoner et al. | | |
| 2006/0171473 A1 | 8/2006 | Schoner | | |
| 2007/0081596 A1 | 4/2007 | Lin et al. | | |
| 2009/0180026 A1 | 7/2009 | Tang et al. | | |

OTHER PUBLICATIONS

Apostolopoulos et al, Postprocessing for Very Low Bit-Rate Video Compression, IEEE Transactions on Image Processing, vol. 8, No. 8, Aug. 1999.*
H. S. Kong, A. Vetro, H. Sun, "Edge map guided adaptive post-filter for blocking and ringing artifacts removal," Proceedings of the 2004 International Symposium on Circuits and Systems, vol. 3, pp. 929-32, May 2004.*

* cited by examiner

*Primary Examiner* — Andrae S Allison
(74) *Attorney, Agent, or Firm* — Lando & Anastasi, LLP

(57) ABSTRACT

A system and method for processing a digital video signal corresponding to an image are provided. A plurality of independent edge detecting processes or edge detector modules detect a set of edges and at least one additional edge that is not included in the set of edges. An edge map includes data regarding all edges identified by any edge detecting process or module, and a visually perceptible artifact of the image is altered based at least in part on an evaluation of the edge map. The system and method detects and filters block artifacts and ringing or other noise from digital images, resulting in reduced image distortion.

20 Claims, 10 Drawing Sheets

SYSTEM AND METHOD FOR DETECTING EDGES IN A VIDEO SIGNAL

FIELD OF THE INVENTION

Aspects of the present invention are directed to the processing of a digital video signal, and more particularly to a system and method for signal processing that detects edges in a digital video signal and can additionally modify visually perceptible artifacts or degradations of the digital video signal based on an evaluation of the detected edges.

DISCUSSION OF THE RELATED ART

Digital video signals contain compressed data in order to conserve system resources such as bandwidth and memory. To do so, each of the images that constitute the video signal is divided into a series of quadrilateral segments, referred to as blocks, and each block contains at least one pixel, ordered by row and column. The data in each of these blocks is transformed into a matrix of coefficients. These coefficients are then quantized into discrete values, and each quantized coefficient matrix is compressed to further reduce the matrix to a smaller array of discrete numbers. A Fourier related transform such as a discrete cosine transform (DCT) is an example of a transform that is applied to each block to facilitate this data compression. Known video compression standards using this type of compression include MPEG, JPEG, H.261, H.263, etc.

Image compression for digital video signals is not without its drawbacks. For example, most well known forms of compression are lossy, and as such, a certain amount of data is permanently lost during the compression processes. Due to this data loss, a reconstructed image based on the compressed signal is typically not identical to the image as it existed prior to its compression and encoding. Instead, the reconstructed image is an estimation of what the original image looked like. Various compression schemes seek to minimize the impact of the lost data by canceling redundant spatial or temporal data, nearly redundant data, or data that is deemed to be of less importance. Despite these efforts, meaningful compression of a video signal inevitably results in various unwanted compression artifacts and other humanly perceptible data errors.

A common compression artifact is known as a block artifact. Block artifacts are the visible outlines of the individual blocks that form the reconstructed image and that are not part of the original image. Block artifacts result in abrupt and unnatural looking changes in the color, intensity, or shape of an image. These visible block outlines degrade the quality of the image and can be objectionable to a viewer. Another common compression artifact is known as ringing noise. Ringing noise can occur in the vicinity of a high contrast region of the original image where, for example, bright (e.g., white) and dark, (e.g., black) areas of the original image are adjacent to each other, a frequent occurrence when depicting computer graphics, text, hard edge art, or many other images. Ringing noise causes a sharply contrasted region of an original image such as a curved black line on a white background to appear blurred, jagged, or surrounded by distortion.

Post processing activity can mitigate the impact of these unwanted artifacts that appear in a reconstructed image but which are not present in the original image. Post processing applications evaluate the reconstructed image in an attempt to distinguish between features of the original image and unwanted features that are an artifact of the encoding and decoding operations. The features determined to have been added as artifacts of the encoding and decoding operations may be removed from the reconstructed image, thus improving image quality by more closely matching the original image. Some post processing applications rely on additional information such as macroblock and other encoding information embedded in the video signal regarding the conditions of the compression and encoding for specific blocks of compressed data. This information, which may include quantizer scale values, maximum or minimum pixel value within a macroblock, frame or field type, or discrete cosine transform (DCT) picture type, can help to indicate which features of the image are compression artifacts that should be removed during image reconstruction. However, this type of embedded data must be included in the video input signal to allow its use, and while typically accessible to a device receiving the compressed image data (e.g., a decoder, set-top box, etc.), may not be known or accessible to the device receiving the decompressed video data.

In the absence of macroblock information, compression artifacts may be identified by determining if rapidly changing regions of color or intensity contrast in a reconstructed image are edges that form part of the original image, or if they are unwanted compression artifacts to be filtered out of the reconstructed image. This can be done by use of a gradient operator that computes a two dimensional first derivative of this intensity change. By convolving the pixels of an image with a gradient operator an intensity gradient may be obtained where maximum or minimum peaks in this intensity gradient may be determined to correspond to image edges. The location of these now-identified edges can then be more accurately determined by taking the second derivative of the first derivative to determine the rate of change in the intensity gradient. The areas of zero crossings resulting from the second derivative correspond to maximum or minimum peaks in the intensity gradient. Therefore, edge locations in a digital video signal can be determined by taking the first derivative of the intensity change between pixels that comprise one or more blocks, and these locations may then be refined be taking the second derivative of the intensity gradient. The location of edges detected by determining a first derivative, (and in some cases, as refined by determining a second derivative) may then be used to determine the existence of block artifacts or other unwanted noise, which may then be filtered from the reconstructed image.

However, Applicants have determined that existing forms of edge detection are imperfect, as certain edges of the image are pathologically missed by known edge detectors. As a result, some image edges are not detected. These undetected edges can be confused with compression artifacts or other noise. The failure to detect edges can lead to a failure to properly filter block artifacts and other noise, such as ringing noise, and can lead to the filtering of actual edges. These imperfections then appear in the reconstructed image, thus degrading its quality.

SUMMARY OF THE INVENTION

Embodiments of the present invention are directed to a system and method of processing a digital video signal corresponding to an image. Advantageously, a plurality of independent edge detection processes can be used to generate a comprehensive edge map that includes all of the edges detected by each of the plurality of independent edge detection processes and may then be used to modify visually perceptible artifacts in the image. This improved edge detection can result in the production of a reconstructed image that more closely resembles the original image.

In accordance with one aspect of the present invention, a method of processing a digital video signal corresponding to an image is provided. The method uses a first edge detecting process to identify a set of zero or more edges in an image based upon the digital signal. A second, independent, edge detecting process is used to identify at least one additional edge in the image that is not identified by the first edge detection process, where the second edge detecting process is different from the first edge detecting process. The first set of edges and the at least one additional edge are combined to generate an edge map, and the edge map includes the set of edges and the at least one additional edge. The digital video signal is processed to modify visually perceptible artifacts in the image based upon the edge map.

In one embodiment, identifying the first plurality of edges and the at least one additional edge are based solely upon the digital video signal. In a further embodiment, the at least one additional edge is a first at least one additional edge, and a third edge detecting process independently identifies a second at least one additional edge in the image based upon the digital video signal that is not identified by the first edge detecting process or the second edge detecting process. In this embodiment, the third edge detecting process is different from the first edge detecting process and the second edge detecting process, and the act of combining includes an act of combining the set of edges identified by the first edge detection process, the first at least one additional edge identified by the second edge detection process, and the second at least one additional edge identified by the third edge detection process, all to generate the edge map.

In various embodiments, any edge included in the set of edges, or any additional edge, may include horizontal edges, vertical edges, or both horizontal and vertical edges. In a further embodiment, the digital video signal includes luminance and chrominance components for each pixel of the image. In one embodiment, at least one of the acts of identifying includes acts of performing a 2-dimensional gradient measurement for each pixel of the image by convolving each pixel of the image with a pixel mask to determine horizontal and vertical gradient values for each luminance and chrominance component of a respective pixel. Further embodiments include comparing an absolute value of each of the horizontal and vertical gradient values to a respective threshold, and identifying the respective pixel as an edge when the absolute value of at least one of the horizontal and vertical gradient values exceeds the respective threshold.

Another embodiment includes acts of receiving an identifier indicative of a block boundary in the image and determining, based upon component values of pixels on each side of the block boundary, whether a potential blocking artifact is present in the image. One embodiment further includes acts of determining whether a location of the potential blocking artifact corresponds to an edge in the edge map, and filtering the potential blocking artifact when it is determined that the potential blocking artifact does not correspond to an edge in the edge map.

One embodiment includes the acts of determining, for each pixel of the image, whether a respective pixel corresponds to an edge in the edge map and determining a number of edges in a vicinity of the respective pixel when the respective pixel does not correspond to an edge in the edge map. Responsive to a determination that the number of edges in the vicinity of the respective pixel is less than a threshold number of edges, component values of the respective pixel are filtered to remove noise in the component values of the respective pixel.

Another embodiment includes the acts of determining, for each pixel of the image, whether a respective pixel corresponds to a block of pixels in which at least one pixel of the block of pixels corresponds to an edge in the edge map and determining, responsive to a determination that at least one pixel in the block of pixels corresponds to an edge in the edge map, whether the respective pixel corresponds to an edge in the edge map. In response to a determination that the respective pixel does not correspond to an edge in the edge map, a number of edges in a vicinity of the respective pixel are determined, and, in response to a determination that the number of edges in the vicinity of the respective pixel is less than a threshold number of edges, the component values of the respective pixel are filtered to remove noise in the component values of the respective pixel.

In a further embodiment, the acts of identifying the set of edges, identifying the at least one additional edge, combining the set of edges and the at least one additional edge, and processing the video signal, are performed by a processor, and the method is implemented in a program stored in a computer readable medium and executed by the processor.

In accordance with another aspect of the present invention, a system for processing a digital video signal corresponding to an image is provided. The system comprises a first edge detector module configured to receive the digital video signal and identify a set of zero or more edges in the image based upon the digital video signal. A second edge detector module is configured to receive the digital video signal and independently identify at least one first additional edge in the image that is not identified by the first edge detector module. A processor is configured to receive the digital video signal, the set of zero or more edges, and the at least one first additional edge and process the digital video signal to modify visually perceptible artifacts in the image signal based upon the set of edges and the at least one first additional edge.

In one embodiment, the first edge detector may identify a set of zero or more edges based solely on the digital video signal, and the second edge detector module independently identifies at least one first additional edge based solely upon the digital video signal.

Some embodiments include a third edge detector module that receives the digital video signal and independently identifies at least one second additional edge. This second additional edge includes an edge that was not identified by any other edge detector module. The processor receives the digital video signal, the set of edges, the at least one first additional edge, and the at least one second additional edge and processes the digital video signal to modify the visually perceptible artifacts in the image based upon the set of edges and the at least one first additional edge.

In one embodiment, the third edge detector module receives the digital video signal and independently identifies at least one second additional edge in the image that is neither identified by the first edge detector module nor by the second edge detector module. In this embodiment, the processor is further configured to receive the digital video signal, the set of edges, the at least one first additional edge, and the at least one second additional edge and process the digital video signal to modify the visually perceptible artifacts in the image based upon the set of edges, the at least one first additional edge, and the at least one second additional edge.

In one embodiment, the digital video signal includes luminance and chrominance components for each pixel of the image, and at least one of the first edge detector module and the second edge detector module identifies edges by convolving each respective pixel in the image with a pixel mask to determine horizontal and vertical gradient values for the luminance and the chrominance components of the respective pixel. An absolute value of each of the horizontal and vertical gradient values is compared to a respective threshold, and the respective pixel is identified as an edge when the absolute value of at least one of the horizontal and vertical gradient values exceeds the respective threshold.

In another embodiment, the processor is configured to receive an identifier indicative of a block boundary in the image and to determine whether a potential blocking artifact is present in the image based on component values of pixels on each side of the block boundary. In this embodiment, the processor is further configured to determine whether a location of the potential blocking artifact corresponds to an edge included in the set of edges or the at least one first additional edge, and to filter the potential blocking artifact when it is determined that the potential blocking artifact does not correspond to an edge in the set of edges or the at least one first additional edge.

In a further embodiment, the processor is configured to determine, for each pixel of the image, whether a respective pixel corresponds to an edge in the set of edges or the at least one first additional edge and to determine, responsive to a determination that the respective pixel does not correspond to an edge in the set of edges or the at least one first additional edge, a number of edges in a vicinity of the respective pixel. In response to a determination that the number of edges in the vicinity of the respective pixel is less than a threshold number of edges, the processor is configured to filter component values of the respective pixel to remove noise in the component values of the respective pixel.

In a still further embodiment, the processor is configured to determine, for each pixel of the image, whether a respective pixel corresponds to a block of pixels in which at least one pixel of the block of pixels corresponds to an edge in the set of edges or the at least one first additional edge and to determine, responsive to a determination that at least one pixel in the block of pixels does correspond to an edge in the set of edges or the at least one first additional edge, whether the respective pixel corresponds to an edge in the set of edges or the at least one first additional edge. Responsive to a determination that the respective pixel does not correspond to an edge in the set of edges or the at least one first additional edge, the processor is configured to determine a number of edges in a vicinity of the respective pixel and to filter, responsive to a determination that the number of edges in the vicinity of the respective pixel is less than a threshold number of edges, component values of the respective pixel to remove noise in the component values of the respective pixel.

In accordance with another aspect of the present invention an edge detector is provided. The edge detector comprises a processor and a memory coupled to the processor. The memory has stored therein a pixel mask formed by a three-by-three matrix of mask values, the three-by-three matrix of mask values having a first diagonal and a second diagonal and including identical mask values across the first diagonal and the second diagonal. The processor is configured to convolve component values of pixels of a digital video signal corresponding to an image with a corresponding mask value in the pixel mask to form a gradient value, and to compare the gradient value to a threshold to identify edges in the image.

In some embodiments the pixel mask includes a first column, a second column, and a third column, wherein an absolute value of a mask value in a row of the second column is twice an absolute value of the corresponding mask value in the row of the first column, and twice an absolute value of the corresponding mask value in the row of the third column. In one embodiment, the three-by-three matrix includes a first row, a second row, and a third row, and an absolute value of a mask value in each row of the second column is twice an absolute value of the corresponding mask value in each corresponding row in the first column and the third column. The second column is, in one embodiment, adjacent to both the first column and the third column.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. The foregoing and other objects, features, and advantages of the system and method disclosed herein will be more fully understood from the following description of various embodiments, when read together with the accompanying drawings, in which.

DETAILED DESCRIPTION

Figure 1:
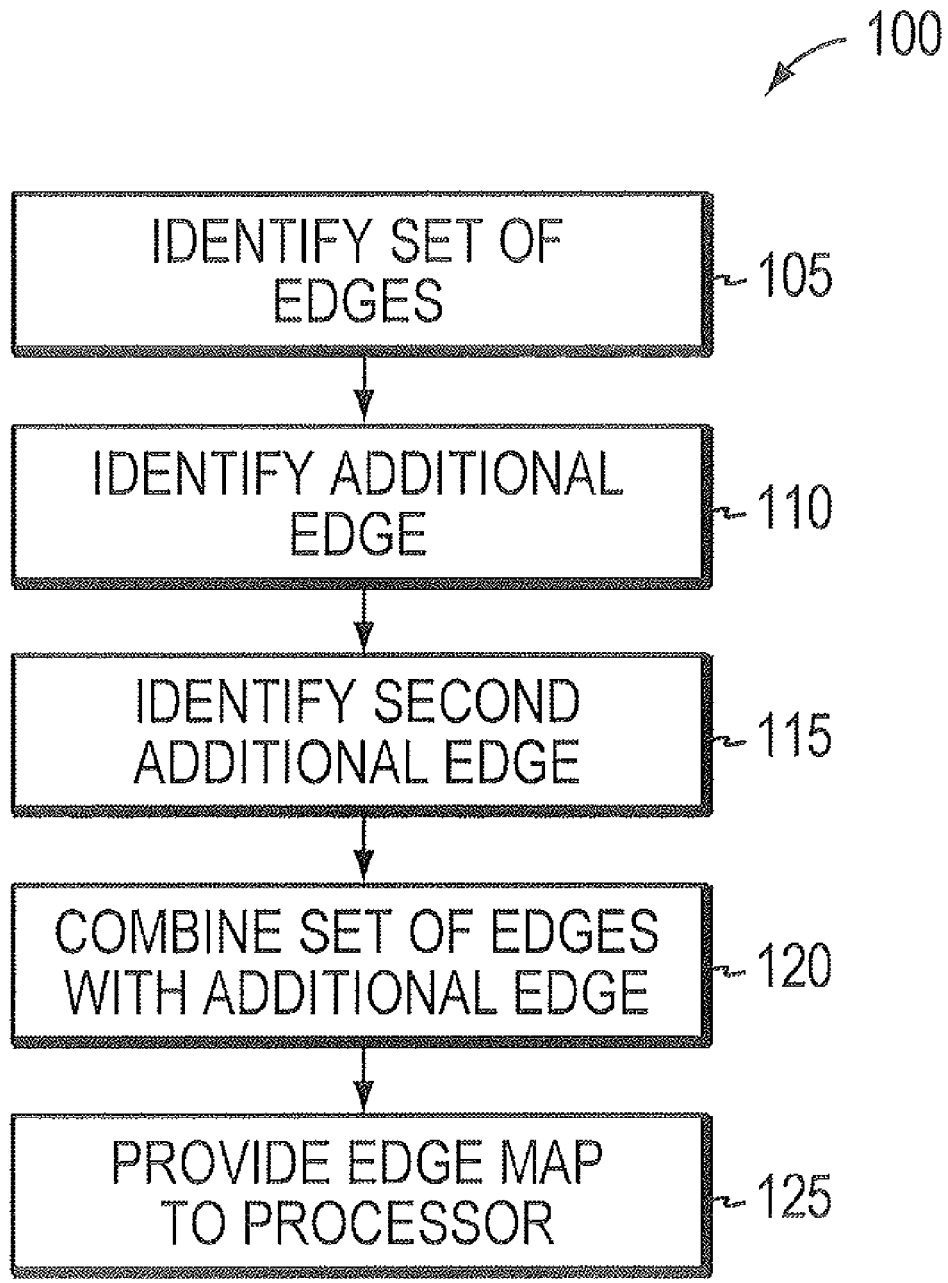
FIG. 1 is a flow chart depicting a method of processing a digital video signal corresponding to an image in accordance with an embodiment of the invention.

Various embodiments and aspects thereof will now be described in more detail with reference to the accompanying figures. It is to be appreciated that this invention is not limited in its application to the details of construction and the arrangement of components set forth in the following description or illustrated in the drawings. The invention is capable of Is other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

As used herein, the term "data" refers to physical signals that indicate or include information. The term "data" includes data existing in any physical form, and includes data that are transitory or are being stored or transmitted. For example, data may exist as electromagnetic or other transmitted signals or as signals stored in electronic, magnetic, or other form.

A "memory" is a physical medium that can store data. Examples of memories include magnetic media such as diskettes, floppy disks, and tape; optical media such Magneto-Optic disks, CDs, and DVDs; and semiconductor media such as semiconductor ROMs, RAMs, etc.

A display device refers to a device that can receive audio and/or video data and provide a representation of that data in a human perceptible form. Examples of display devices include screen display devices such as televisions, computer monitors, PDA or cell phone screens, projection display devices, etc., as well as audio display devices such as radios and other types of audio systems.

As shown in the drawings for the purposes of illustration, the invention may be embodied in a system and method for processing a digital video signal corresponding to an image. This system and method enables robust and independent identification of edges of an image. Embodiments of the invention may further modify visually perceptible artifacts based on the identified edges.

As noted above, Applicants have determined that conventional edge detection processes may fail to detect edges in an image under certain circumstances. Although it is theoretically possible to design an edge detection process that is capable of detecting all edges in an image under any circumstances, the complexity of such a process would be difficult to realize with conventional technology, at least in a commercially viable manner. However, by combining a number of distinct, independent, and at least partially complimentary edge detecting processes, each capable of detecting different manifestations of edges that may be present in an image, an improved edge detector may be provided that may be implemented with currently available technology and in a commercially viable manner.

FIG. 1 is a flow chart depicting a method 100 of processing a digital video signal in accordance with an embodiment of the invention. The method 100 includes a first act of identifying, using a first edge detection process, a set of zero or more edges that may be present in the image based upon a received digital video signal (ACT 105). If no edges are identified, the set of edges is a null set including zero edges. The act of identifying (ACT 105) may include identifying edges by evaluating abrupt changes in color or intensity of the image, and determining that these locations of abrupt change are edges in the image. In one embodiment the act of identifying the set of zero or more edges in a digital image (ACT 105) includes identifying the locations in the image where a sharp change in luminance, chrominance, or both, is detected. These locations in the image include, for example, discontinuities between object features in the image, in image depth, surface orientation, or variations in image illumination.

In one embodiment, the act of identifying a set of edges (ACT 105) includes the use of a first edge detection process that performs a two dimensional gradient measurement on an image to detect regions of high spatial frequency that may correspond to edges of the image oriented in a horizontal direction, a vertical direction, neither, or both. In this embodiment, at least one pixel of an image is separately convolved with a mask to produce separate component gradient measurements in each direction (e.g., horizontal and vertical.) In this embodiment, identifying the set of zero or more edges (ACT 105) includes identifying any region of the image where a two dimensional (2D) first derivative of the image has a maximum or minimum intensity gradient magnitude. The act of identifying the set of zero or more edges (ACT 105) using a first edge detecting process may further include identifying any region of the image where a two dimensional second derivative of the image has a zero crossing, which generally identifies the rate of change in the intensity gradient. In one embodiment, the second derivative of the image may be formed by taking the derivative of the first derivative, and can be used to refine the location of a potential edge that has already been detected by taking the first derivative of the image.

For example, identifying the set of zero or more edges (ACT 105) using the first edge detection process can include determining the image intensity gradient or other two-variable function. In this illustrative embodiment, the result is a two dimensional vector with components in both the horizontal and vertical directions for each evaluated image pixel. Any resulting vectors generally represent a set of zero more potential edges in the image, in, for example, a horizontal or a vertical direction. Furthermore, the first edge detecting process used in act 105 may separately detect chrominance channels (e.g., U and V channels), a luminance channel (e.g., Y channel), or any combination thereof. In various embodiments, identifying the set of zero or more edges (ACT 105) using the first edge detecting process may include using any of a Sobel operator, a Laplace operator, a comb operator, or another discrete differentiation operator.

Once the gradient measurements have been taken, for example by determining the first derivative of the image, the second derivative or the image, or both, a set of pixel locations representing potential edges is identified. After identifying the locations of potential edges, a determination may then be made as to whether the set of potential edges do in fact constitute edges of the image. In other words, the act of identifying the set of edges (ACT 105) may include determining whether the gradient measurements represent locations of change in the image sufficient to constitute an edge of the image. This can be done, for example, by applying a threshold to the set of potential edges detected using the first edge detection process. In one illustrative embodiment, the thresholds may include programmable thresholds residing in programmable registers, and as such may be adjustable. In one embodiment, the absolute values of the gradient components of the potential set of zero or more edges are compared with these thresholds, and those components having an absolute value greater than the threshold value are declared to be edges. In various embodiments, the thresholds include gradient component values in any direction, such as vertical or horizontal, and may include separate luminance or chrominance values.

Identifying the set of zero or more edges (ACT 105) may also include analyzing macroblock or other encoding information that is embedded in the digital video signal. Macroblock or other encoding information is generally data embedded in a digital signal regarding the conditions of compression encoding used on specific blocks of compressed data. Examples of macroblock or other encoding information include quantizer scale values, maximum pixel values within a macroblock, minimum pixel values within a macroblock, frame type, field type, discrete cosine transform (DCT) picture type, (such as intra-coded frames, predictive coded frames, or bidirectional predictive coded frames), or other data transmitted with a digital signal. Analysis of macroblock or other encoding information may be used to facilitate detecting the set of zero or more edges (ACT 105) by providing evidence regarding the location of block boundaries in an image, by identifying locations in the image where encoding information suddenly changes, or both. It should be appreciated that macroblock or other encoding information may not always be readily accessible or included in a digital video signal. As a result, various embodiments of the invention include identifying the set of zero or more edges (ACT 105) based upon a digital video signal that need not, but may, include macroblock or other encoding information. In one embodiment, only the digital video signal corresponding to the image data is analyzed to identify edges which may then be filtered, as appropriate, to modify the image corresponding to the digital video signal. Advantageously, this embodiment can be used with a video signal that does, or does not include any additional macroblock or other encoding information.

Method 100 also includes an act of identifying, using a second and edge detecting process, at least one additional edge in the image that is not identified by the first edge detecting process (ACT 110). In act 110, the at least one additional edge is identified using a second edge detecting process that is different from, and at least partially complementary to the first edge detecting process. For example, this may include the use of a different differentiation operator or mask, or different threshold values to determine if a gradient component is of sufficient absolute value so that the corresponding region of the image is deemed to be an edge, or both.

In one embodiment the second edge detecting process that identifies the additional edge (ACT 110) is independent of the first edge detection process. For example, in one embodiment no information is transferred between the first edge detection process and the second edge detection process. Thus, the first edge detection process and the second edge detection process may each receive the same digital video signal and separately identify, respectively, the set of zero or more edges (ACT 105) and at least one additional edge (ACT 110). In various embodiments, either the same or different threshold values are applied to the gradient component vectors resulting from the first edge detection process and from the second edge detection process. In one embodiment, the first and second edge detection processes convolve image pixels with different masks so that the set of zero or more edges identified by the first edge detection process differs from the at least one additional edge identified by the second edge detection process; that is, the second edge detection process identifies at least one additional edge that was not identified during the act of identifying the set of zero or more edges (ACT 105) by the first edge detection process. It is appreciated that identifying at least one additional edge (ACT 110) may include identifying some edges that have also been identified by the first edge detecting process during the act of identifying the set of zero or more edges (ACT 105).

The method of processing the digital signal may further include independently identifying, using a third edge detection process, at least one second additional edge (ACT 115). Identifying at least one second additional edge (ACT 115) may include the use of a third edge detecting process that is different than both the first edge detecting process and the second edge detecting process. For example, each of the first, second, and third edge detecting processes may convolve each image pixel with different masks to produce separate gradient component measurements (such as gradient component measurements in the horizontal and/or vertical direction). These gradient components, for each of the first, second, and third edge detecting processes, may be independently compared against one or more thresholds to determine, for each edge detecting process, whether an edge exists.

It should be appreciated that in various embodiments, any number of independent edge detection processes may be used, wherein each edge detection process independently identifies at least one further additional edge that can not be identified by any other edge detection process, and that is not included in any set of identified edges. Indeed, in contrast to conventional solutions that use the combined results of several processes and compare the combined results to a single threshold, each act of identifying may utilize its own threshold. Thus, each edge detection process may be optimized to detect only certain types of edges that it can positively identify. For example, if testing reveals that a certain edge detecting process can detect certain edges with high confidence, but also generates false-positive results with lower confidence, the threshold value may be set suitably high to ensure only true edges are detected and the false-positives are ignored. Thus, in accordance with an aspect of the present invention, a number of different edge detecting processes may be used, each capable of detecting certain types of edges in an image with varying degrees of confidence, and appropriate thresholds set so that only those edges that are identified with a high confidence are determined to be true edges.

As described above, an illustrative embodiment of method 100 includes identifying, using a first edge detection process, a set of zero or more edges (ACT 105) and identifying, using a second edge detection process, at least one additional edge, (ACT 110). In this embodiment, method 100 proceeds by combining the set of edges identified by the first edge detection process and the at least on additional edge identified by the second edge detection process to generate a combined edge map (ACT 120). The combined edge map is a comprehensive set of all identified or known edges in an image, and in one embodiment includes a binary map representing the visual edges in the digital image.

In accordance with this embodiment, the generated edge map will therefore include all identified edges determined by each of the independent edge detection processes, and therefore may include the set of edges identified by the first edge detecting process (ACT 105), the at least one additional edge independently identified by the second and different edge detecting process (ACT 110), and the second additional edge independently identified by the third and different edge detecting process (ACT 115), as well as any edges identified by any further independent edge detecting process. For example, generating the edge map (ACT 120) can include storing and aggregating together all of the detected edges together with data indicating the location of each edge in the image. In one embodiment, generating the edge map (ACT 120) includes generating both a horizontal edge map, and a vertical edge map. In this embodiment, the horizontal edge map includes the horizontal gradient component of all identified edges, and the vertical edge map includes the vertical gradient component of all identified edges.

In one embodiment, method 100 further includes the act of providing the edge map to a processor that processes the digital video signal to modify visually perceptible artifacts in the image based upon the edge map (ACT 125). Providing the edge map (ACT 125), for example, includes inputting or transmitting data regarding edge existence and/or location to a processor, or otherwise allowing the processor access to the edge map and any data included therein. In one embodiment providing the edge map to the processor (ACT 125) includes providing sufficient data to the processor to indicate both the location and gradient magnitude of all identified edges of the image. In this embodiment, the processor may then process the video signal to modify any visually perceptible artifacts in the image based on the edge map. As will be discussed, this modification may include, for example, various forms of filtering, deringing, or edge sharpening alterations to the image.

Figure 2:
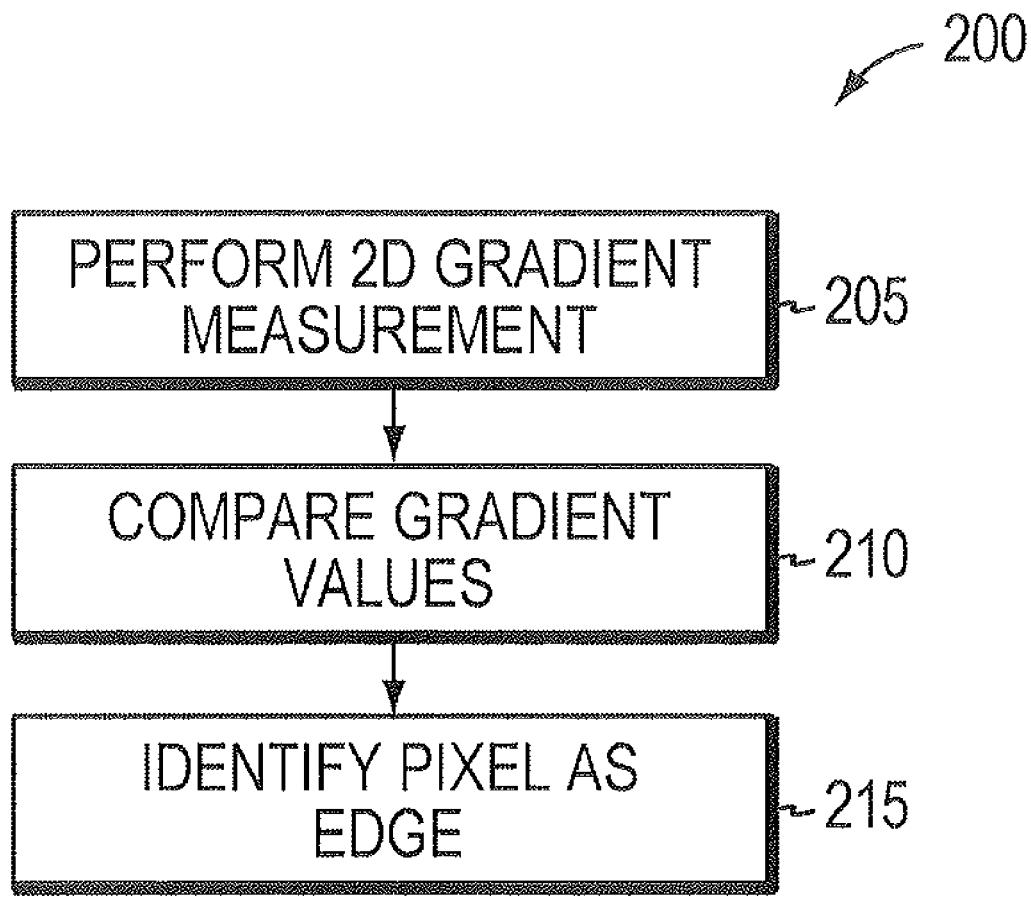
FIG. 2 is a flow chart depicting a method of identifying an edge of an image of a digital video signal in accordance with an embodiment of the invention.

FIG. 2 is a flow chart depicting a method 200 of identifying an edge of an image of a digital video signal that may be used by the first edge detection process, the second edge detection process, or any other edge detection process in accordance with an embodiment of the invention. Method 200 includes the act of performing, for at least one pixel of the image, a two dimensional (2D) gradient measurement to determine horizontal and vertical gradient values for each of the luminance and chrominance components of the pixel in the image (ACT 205). In one embodiment the act of performing the 2D gradient measurement (ACT 205) includes convolving each pixel of the image with a pixel mask to determine horizontal and vertical gradient values for each of the luminance (Y) and chrominance (U,V) components of a respective pixel, although it should be appreciated that in other embodiments, gradient values in other directions may be determined for luminance only, for chrominance only, or both.

In one embodiment, each of the edge detection processes separately performs two dimensional gradient measurements of each of the image pixels. In this embodiment, the resulting gradient values calculated by one edge detection process do not affect the resulting gradient values, if any, calculated by any other edge detection process.

In one embodiment, after determining gradient values for each of the luminance and chrominance components in each direction, the gradient values are compared to a respective threshold (ACT 210). In one embodiment, the act of comparing includes comparing an absolute value of each of the luminance and chrominance gradient values in each direction with a respective threshold. In this embodiment, the comparison (ACT 210) is made independently of the gradient values that are separately determined by other edge detecting processes. In other words, a first comparison made between a gradient value determined by a first edge detecting process and a first threshold value is unrelated to a second comparison made between a second gradient value determined by a second edge detecting process and a second threshold.

Based upon the comparison performed in act 210, edges are identified. In one embodiment, pixels are identified as defining an edge when the absolute value of a gradient value exceeds a respective threshold (ACT 215). In one embodiment, identifying a pixel as an edge (ACT 215) includes determining that the absolute value of at least one of the horizontal and vertical gradient values exceeds a threshold. Identifying a pixel as an edge (ACT 215) may include an association with a memory capable of storing data that indicates where in an image the at least one edge is located. Generally, the location identified as an edge (ACT 215) may have been identified as an edge by at least one edge detection process. For example, an identified edge can be part of the set of zero or more edges identified by the first edge detection process or any additional edge, such as a first additional edge identified by the second edge detecting process. In an illustrative embodiment, the absolute value of a horizontal gradient value, $G_X$ for each pixel component (e.g. Y,U,V) is compared (ACT 210) to a horizontal threshold value $TH_X$ and the absolute value of the vertical gradient value $G_Y$ for each pixel component (e.g. Y,U,V) is compared to a vertical threshold $TH_Y$. It should be appreciated that gradient values for luminance or chrominance components in either the horizontal or vertical directions may be compared their respective threshold values, and that the threshold values may be different from each other. If the horizontal gradient absolute value $G_X$ exceeds the horizontal threshold value $TH_X$, method 200 proceeds by identifying the pixel associated with horizontal gradient absolute value $G_X$ to be a horizontal edge (ACT 215). It should be appreciated that a pixel can be associated with both a horizontal edge and a vertical edge for any of the pixel components, such as one or more of the Y, U, or V pixel components.

For example, in one illustrative embodiment, the first edge detection process used to identify a set of zero or more edges (ACT 105) performs a 2D gradient measurement on, for example, each pixel of the image. The results are convolved, pixel by pixel, with a pixel mask to determine horizontal and vertical gradient values for the luminance and chrominance components of each pixel. These gradient values are compared to one or more thresholds (ACT 210), and based at least in part on this comparison, any pixel may be identified as an edge (ACT 215) when, for example, an absolute value of at least one of the horizontal and vertical gradient values exceeds the respective threshold.

Continuing with this illustrative example, the second edge detection process used for identifying at least one additional edge (ACT 110) performs a separate 2D gradient measurement on each pixel of the image. The 2D gradient measurement preformed by the second edge detection process is different than the 2D gradient measurement performed by the first edge detection process. The gradient values resulting from the second edge detection process are convolved with a pixel mask, compared to one or more thresholds (ACT 210), and identified as an edge (ACT 215) when the gradient value is above the respective threshold. In one embodiment, the pixel masks used by the second edge detection process are different than the pixel masks used by the first edge detection process. In some embodiments, the thresholds used by the second edge detecting process are different than the thresholds of the first edge detection process. In accordance with the present invention, at least one edge identified by the second edge detection process (ACT 110) is not included in the set of zero or more edges identified by the first edge detection process (ACT 105). As a result, the second edge detecting process is capable of identifying an edge (ACT 110) that was missed by the first edge detecting process. In some embodiments a third or any subsequent edge detection process may also be used to independently detect any edge that has not been previously detected by any other edge detection process.

An image of a decompressed video signal is typically divided, for example, into a number of 8×8 or 16×16 pixel blocks. These blocks are combined to form the image, however, the boundaries between adjacent blocks are areas where unwanted edge distortion may occur due to the presence of blocking artifacts. It is desirable that block boundaries between adjacent blocks be smoothed and continuous, i.e., not visually perceptible, but that the sharpness of edges in the image be maintained. By appropriately distinguishing between edges in an image and blocking artifacts located in the vicinity of block boundaries, the video signal corresponding to the image may be processed to provide a more pleasing appearance. However, to permit such processing, it is important that the edges in an image be reliably detected to avoid confusion with what might otherwise appear to be a blocking artifact. A block boundary that is misidentified as an edge may appear as a sharp and visible point of contrast between two adjacent blocks. This, in turn, may give an image an inaccurate "blocky" appearance where the quadrilateral blocks, often appearing as squares, are visible in the degraded image. Alternatively, an edge that is not detected as such may be misidentified as a blocking artifact and filtered, thereby decreasing its sharpness. In accordance with the present invention, the enhanced ability to reliably detect edges described above may be used to identify and process blocking and other types of artifacts.

Figure 3A:
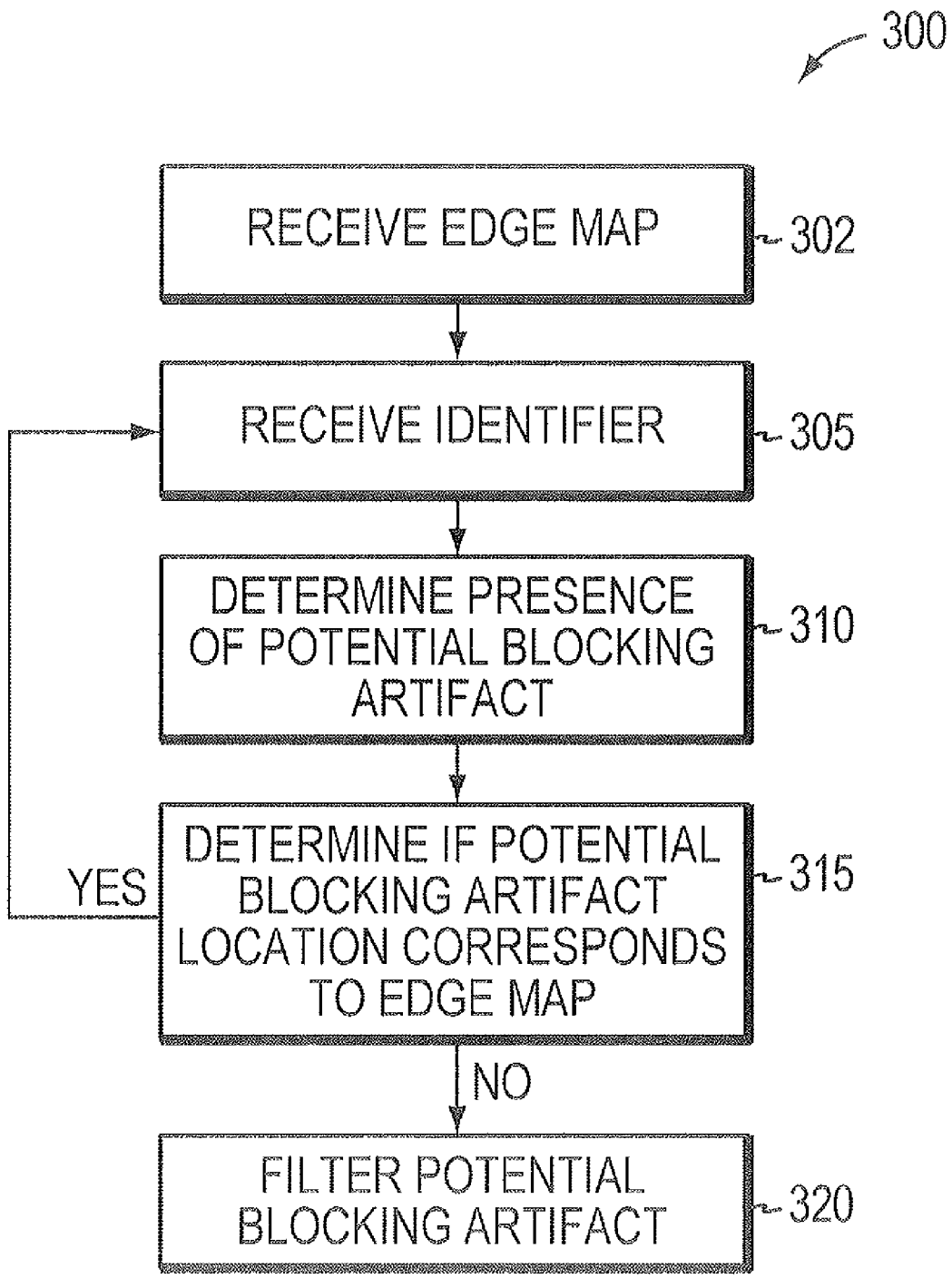
FIG. 3A is a flow chart depicting a method of processing a digital video signal in accordance with an embodiment of the invention.

FIG. 3A is a flow chart depicting a method 300 of processing a digital video signal in accordance with an embodiment of the invention. Method 300 may be performed by a processor in response to receiving an edge map (ACT 302) to modify the video signal to remove undesirable compression artifacts that do not correspond to edges. In one embodiment, receiving an edge map (ACT 302) can include receiving an edge map that was provided to the processor (ACT 125). Method 300 generally includes an act of receiving an identifier indicative of a block boundary in an image (ACT 305). Receiving an identifier of a block boundary (ACT 305) may include receiving data regarding the location of at least one block boundary in the image, data regarding whether the boundary is a horizontal or vertical block boundary, or both. The block boundary identifier may, for example, be provided by the processor that performed the decompression of the compressed video signal, or may be determined using a process as described in more detail below.

In one embodiment, receiving an identifier of a block boundary (ACT 305) can include receiving, for example from the processor that performed the decompression of the compressed video signal, an offset that can be used to determine block boundary locations in the video signal. Generally, the offset may include horizontal offsets or vertical offsets, or both. For pixel blocks of a known and uniform size, such as 8×8 pixel blocks, receiving both a horizontal offset and a vertical offset enables identification of all N×N (e.g., 8×8, 16×16) pixel block boundaries in the image. For example, starting with, the top left corner of the image represented by the video signal, a horizontal offset of zero could be used to indicate a vertical block boundary at row zero, (i.e., the topmost row) and a vertical offset of zero could be used indicate a horizontal block boundary at column zero (i.e., the leftmost column). In this illustrative example, a known horizontal and vertical offset of zero in a video signal having 8×8 pixel blocks corresponds to block boundaries at every eighth column and every eighth row (i.e., columns and rows 7, 15, 23, etc.).

In one embodiment, method 300 further includes an act of determining whether a potential blocking artifact is present in the image (ACT 310). In one embodiment, this determination is based upon component values of pixels on each side of the block boundary. For example, the component values (luminance, chrominance, or both) of a pixel on one side of a block boundary may be compared with one or more threshold values or component values of other pixels to determine the existence of a potential blocking artifact. In various embodiments, this includes a comparison with interblock pixel values or intrablock values, or both. If, for example, a difference between component values of two pixels in two adjacent blocks on opposite sides of a block boundary is greater than a pixel component value difference between two or more pixels within at least one of the two blocks, there may be a potential blocking artifact. This is because the interblock pixel component differential is high (indicating a region of contrast in the image) between adjacent blocks, but the intrablock contrast between values is smaller, (indicating a smoother, more uniform region of the image). This point of contrast may be an edge in the image or an unwanted compression Is artifact such as a visible block boundary.

In one embodiment, after determining whether a potential blocking artifact is present, method 300 determines whether this discontinuity in component values represents an edge that should appear in the image or is a blocking artifact that should be filtered from the image. Accordingly, method 300 proceeds by determining whether a location of the potential blocking artifact corresponds to an edge in the edge map (ACT 315). Determining this correspondence (ACT 315) generally includes comparing at least a portion of the block boundary location where a potential blocking artifact may be present with the location of at least some of the edges, as indicated by the edge map. In one embodiment, where the potential blocking artifact is located at or near an edge, as determined by the edge map, the potential blocking artifact is determined to be an edge, and not a blocking artifact, and that edge appears unmodified in the image. Alternatively, where the potential blocking artifact is not located within a threshold distance of an identified edge, then the potential artifact is determined to be an actual blocking artifact or other type of compression artifact with the potential to distort the image in a visually perceptible manner.

Where a potential artifact does not correspond to an edge in the edge map, and this may be an unwanted compression artifact, method 300 in one embodiment proceeds by filtering the potential blocking artifact (ACT 320) from the image. Filtering the potential blocking artifact (ACT 320) may be thought of as a smoothing of the block boundary and generally entails a manipulation of the component of the value corresponding to a pixel or pixels in the vicinity of the determined artifact so that the block boundary is less visually perceptible. In various embodiments, filtering the potential blocking artifact (ACT 320) includes filtering any of vertical blocking artifacts, horizontal blocking artifacts, or both, and may include filtering only a component (e.g., luminance component Y) or all components (e.g., luminance component Y and chrominance components U and V), as will be discussed further below with respect to FIG. 3C.

Figure 3B:
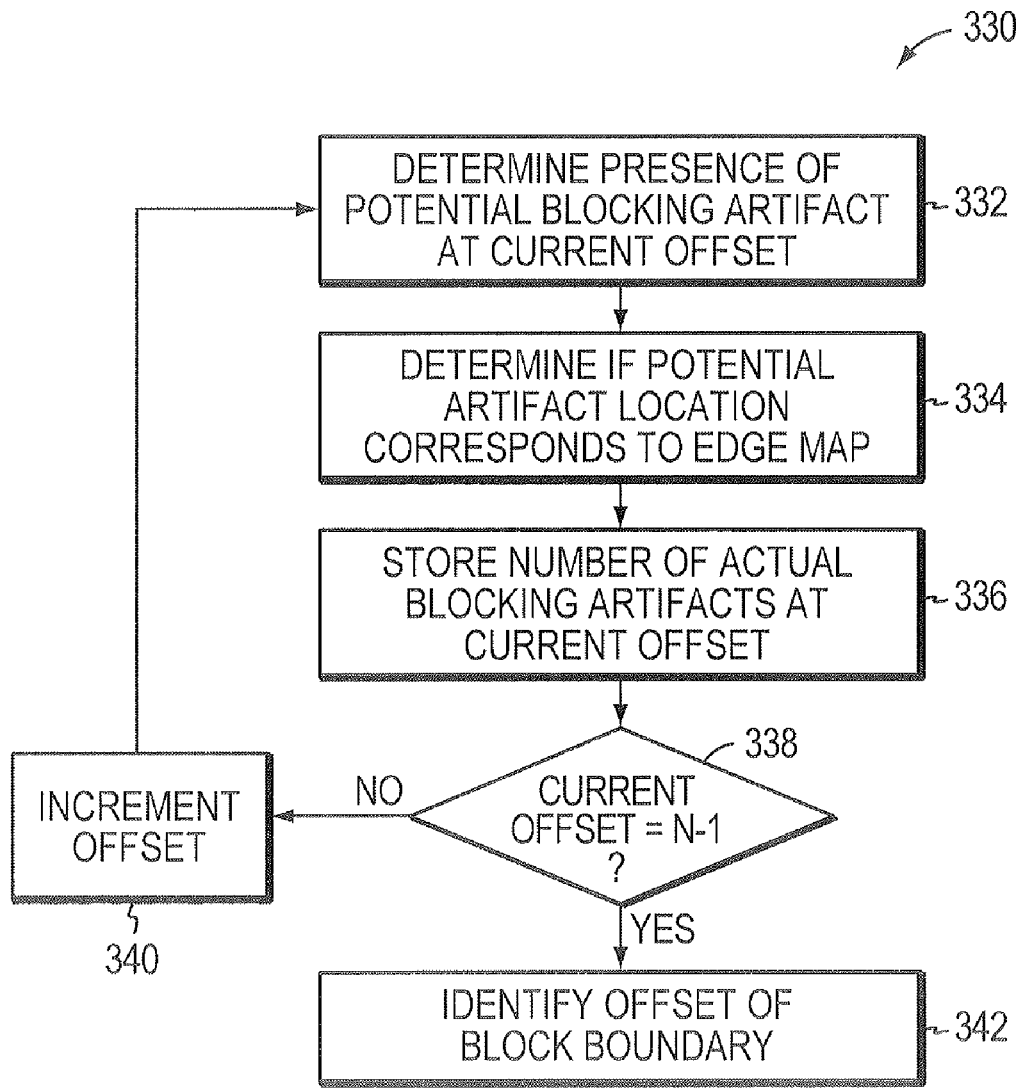
FIG. 3B is a flow chart depicting a method of determining block boundaries in a digital video signal in accordance with an embodiment of the invention.

It should be appreciated that in many instances, an identifier indicative of block boundaries may not be provided, such as where the received video signal includes only image data and any information associated with the prior decoding and decompression of the compressed video signal is not shared with the device performing method 300. In such circumstances, a process for determining block boundaries may be performed to determine the location of block boundaries within an image. As discussed in more detail below, such a process may include acts analogous to acts 310 and 315 described above with respect to FIG. 3A, in which the number of blocking artifacts is determined for each of a plurality of offsets, and the offset corresponding to the greatest number of blocking artifacts is determined to correspond to a block boundary. Such a process for identifying the location of a block boundary 330 is now described with respect to FIG. 3B.

In act 332, the block boundary detection process 330 determines whether a potential blocking artifact is present in the image at the current offset. In accordance with one embodiment, in act 332, pixel component values corresponding to a portion of the image with a known location (typically with respect to the upper left corner of the image) are evaluated relative to neighboring pixel component values to determine whether a potential blocking artifact is present at the current pixel location. For example, where the video signal includes unscaled N×N (e.g., 8×8 or 16×16) pixel blocks, and at an offset of 0, the pixel component values corresponding to row 0, row 7, row 13, etc. and column 0, column 7, column 13, etc. of the image are evaluated relative to neighboring pixels for the presence of a potential blocking artifact in both the vertical and horizontal directions.

In a manner analogous to that described with respect to act 310 of FIG. 3A, this generally includes a comparison between interblock and intrablock pixel component values on either side of the row or column of the pixel being evaluated. For example, in act 332, the pixel component value of each pixel in column 7 is compared to the pixel component values in columns 6 and 8-9 in the same row as the current pixel to determine whether the difference (i.e., the interblock difference) between the pixel component values of columns 7 and 8 (on opposite sides of the assumed block boundary,) is greater than the difference (i.e., the intrablock difference) between pixel component values on either side of the assumed block boundary (i.e., the difference in component values between the pixels of columns 6 and 7 and columns 8 and 9). Where the interblock difference is significant relative to the intrablock difference, then a potential horizontal blocking artifact is determined. A similar process is performed to determine the presence of vertical blocking artifacts (e.g., by comparing pixel component values in each rows 0, 7, 13 with the component values of pixels in adjacent rows of the same column as the current pixel).

In act 334, a determination is made as to whether the potential blocking artifacts identified at the current offset correspond to an edge in the edge map. This may be performed in a manner analogous to determination made in act 315 of FIG. 3A. Where the potential horizontal or vertical blocking artifact corresponds to a horizontal or vertical edge in the edge map, then a determination is made that the potential blocking artifact is not an actual blocking artifact, but an edge. Alternatively, wherein the potential horizontal or vertical blocking artifact does not correspond to a horizontal or vertical edge, then that potential blocking artifact is determined to be an actual blocking artifact.

In act 336, the number of actual blocking artifacts determined in act 334 are summed and stored with respect to the current offset, with the block boundary detection process proceeding to act 338, wherein a determination is made as to whether acts 332, 334, and 336 have been performed for each of the N−1 possible offsets. For example, for an image in which the pixels are organized as 8×8 pixel blocks, acts 332, 334, and 338 would be performed for each of the 8 offsets (i.e., offsets 0 through 7). Where the pixels are organized as 16×16 pixel blocks, acts 332, 334, and 338 would be repeated for each of the 16 offsets (i.e., offsets 0 through 15). Accordingly, when it is determined in act 338 that the current offset is not equal to N−1, the process proceeds to act 340 wherein the offset is incremented, and the acts 332, 334, and 336 are repeated.

Where it is determined in act 338 that all offsets (e.g., offsets 0 through N−1) have been considered, the block boundary detection process 330 proceeds to act 342. In act 342, the block boundary detection process compares the number of actual blocking artifacts stored in acts 336 to one another and selects the offset corresponding to the greatest number of actual blocking artifacts to be the location of the actual block boundaries in the image. For example, if a horizontal offset of two returns the highest number of vertical blocking artifacts, and a vertical offset of four returns the highest number of horizontal blocking artifacts, then process 330 may identify vertical block boundaries at rows 2, 10, 18, etc. and horizontal block boundaries at columns 4, 12, 20, etc. starting from the portion of the video signal that corresponds to the upper left corner of the image. This identified offset may then be provided to the process 300 of FIG. 3A.

Figure 3C:
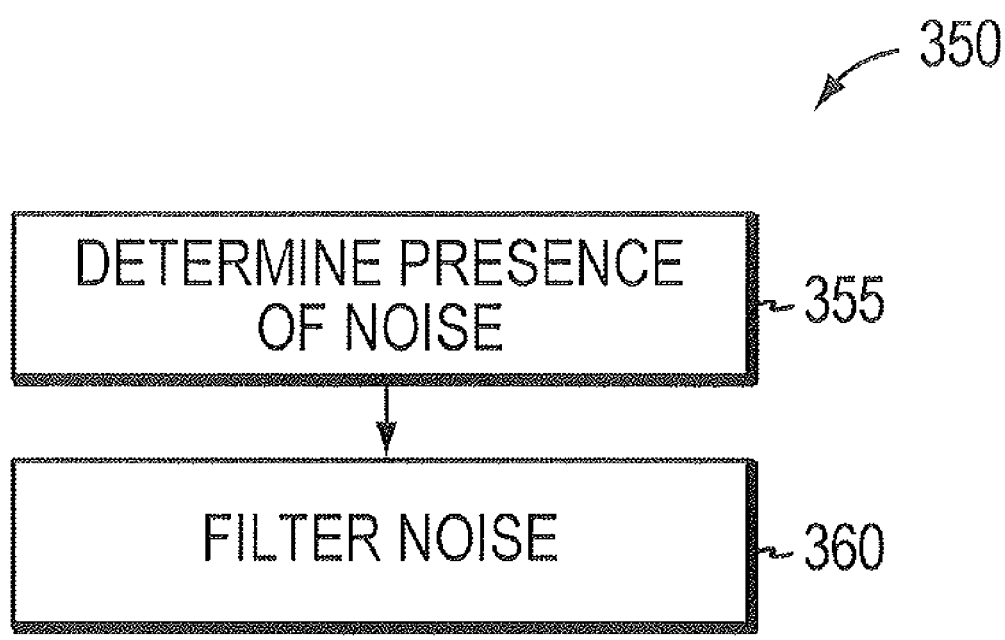
FIG. 3C is a flow chart depicting a method of processing a digital video signal to filter noise in accordance with an embodiment of the invention.

FIG. 3C is a flow chart depicting a method 350 of processing a digital video signal in accordance with an embodiment of the invention that may be used to detect the presence of ringing or other edge noise in a digital video signal and filter that noise. Method 350 may include the act of determining the presence of noise, such as at least one ringing artifact, in a digital video signal (ACT 355).

In one illustrative embodiment, determining the presence of noise (ACT 355) may include determining, for each respective pixel in the image, whether the respective pixel is in a vicinity of an edge, but not an edge pixel itself. In this embodiment, the number of edges in the vicinity of the respective pixel are determined. For example, if the number of edges within a N by N region of the respective pixel is less than a programmable threshold, then that N by N region is flagged as deserving of filtration to remove the ringing and noise, albeit at a cost of potentially blurring the image. Alternatively, if the number of edges within the N by N region of the respective pixel is greater than or equal to the programmable threshold, then that N by N region is not flagged as deserving of filtration in order to preserve the sharpness of the edges in that region, albeit at a cost of leaving some edge and or ringing noise.

In another embodiment, a similar process is performed for determining the presence of noise. However, in this embodiment, not all pixels of the image are evaluated to determine the presence of noise. Instead, in this embodiment, only those pixels that are determined to correspond to a block of pixels (such as an 8×8 discrete cosine transform (DCT) block of pixels) that has at least one edge is evaluated for the presence of noise. For example, if in act 355 it is determined that the current pixel corresponds to a block of pixels in which no edges have been detected, then it may be presumed that filtering of those pixels is not warranted, as noise due to the presence of an edge is unlikely. Alternatively, if the current pixel does correspond to a block of pixels in which at least one edge has been detected, then that block may be flagged as potentially requiring filtration. Whether filtration of edge or ringing noise is warranted may then be evaluated as described above; that is, by determining whether the respective pixel is itself an edge, and if not, by comparing the number of edges in the vicinity of the respective pixel to a programmable threshold, and determining that filtration should be performed if the number of edges is below the programmable threshold.

Method 350 may also include filtering noise from the component values of the respective pixel (ACT 360). In one embodiment, in response to a determination that noise is present in act 355, luminance and chrominance values of pixels in the vicinity of an edge may be filtered for ringing or other edge noise, for example, by use of a Finite Impulse Response (FIR) filter, as described in detail further below.

Figure 4:
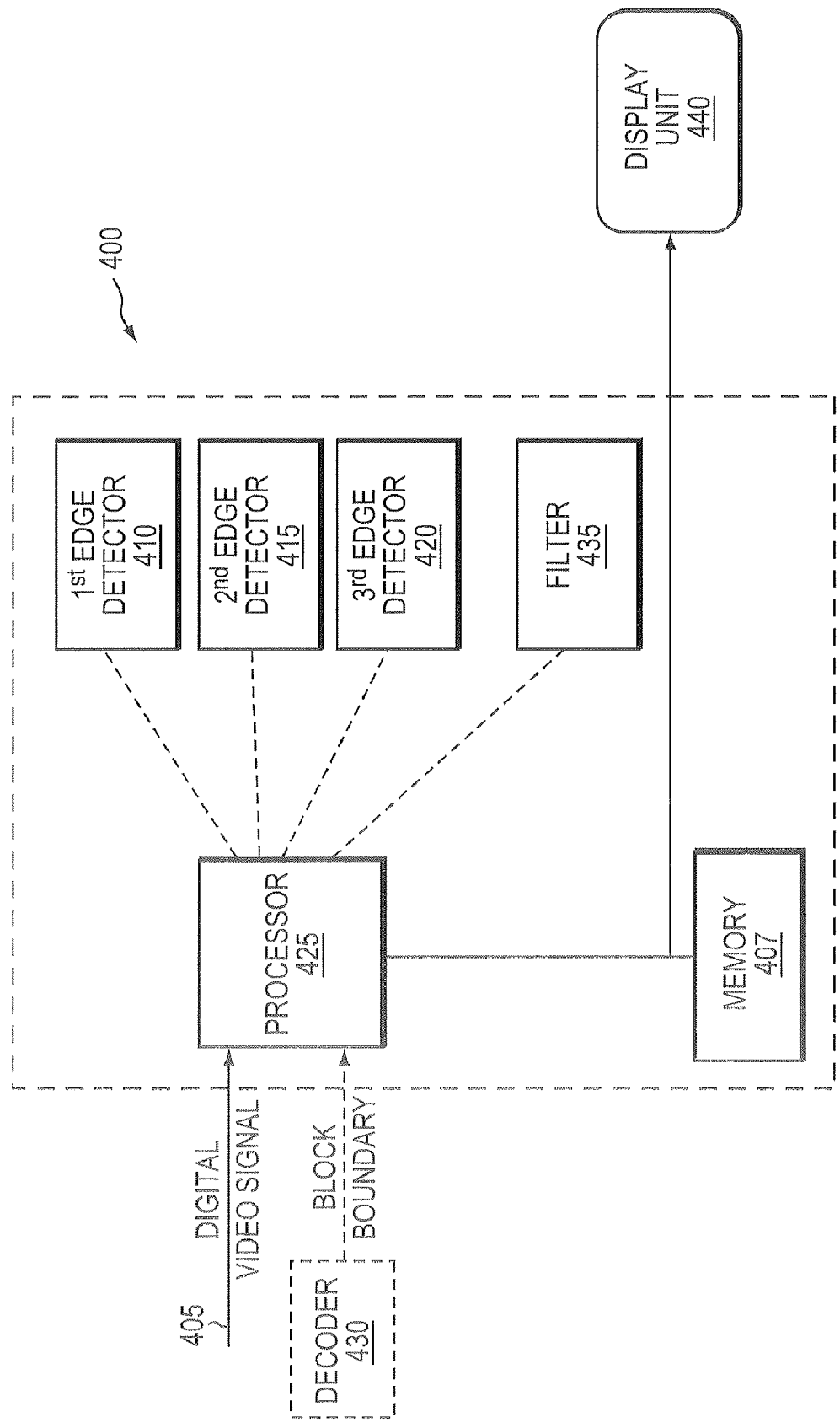
FIG. 4 is a block diagram depicting a system for processing a digital video signal corresponding to an image in accordance with an embodiment of the invention.

FIG. 4 is a block diagram depicting a system 400 for processing a digital video signal in accordance with an embodiment of the invention. System 400 receives at least one digital video signal 405. In one embodiment, the digital video signal 405 includes chrominance channels (U and V) as well as a luminance channel (Y), however, it should be appreciated that the present invention may be adapted to receive and process video signals defined by other color spaces, such as Y, Cb, Cr, etc. In one embodiment, the digital video signal 405 includes a decompressed signal or signals representing an image, such as an MPEG image, and may include a combination of lossy video decompression and lossy audio decompression. In some embodiments digital video signal 405 may, but need not include macroblock or other encoding information. Digital video signal 405 may originate from any type of video source, such as digitized analog components video or High Definition Multimedia Interface (HDMI) connections. In some embodiments digital video signal 405 is compliant with the Moving Picture Experts Group MPEG-2 or MPEG-4 or other video compression standards.

System 400 generally includes a first edge detector module 410, a second edge detector module 415, a processor 425, a memory 407, and a filter 435. The system 400 may also include additional edge detectors, such as a third edge detector module 420, and a display unit 440, such as a plasma or liquid crystal display (LCD) screen, or a cathode ray tube (CRT) display, for example. Each of the edge detector modules 410, 415, 420 may include a logic device with sufficient processing power and memory space to perform the operations indicated herein, or alternatively, may be implemented by the processor 425 alone, or in combination with other logic. First edge detector module 410 receives digital video signal 405 either directly, from the processor 425, or from memory 407 if stored therein, and identifies a set of zero or more edges in the image based on digital video signal 405. First edge detector module 410 may perform, for example, any of a Sobel operator, Laplace operator, or other similar discrete differentiation operators capable of calculating a gradient of image intensity for at least one pixel that forms part of an image.

In one embodiment, first edge detector module 410 determines gradient maxima or minima by evaluating the first derivative of an image. First edge detector module 410 may additionally identify zero crossings based on the second derivative of the image. In various embodiments the first and/or second derivatives of the digital video signal 405 are analyzed by first edge detector module 410 to identify a first set of edges. In an illustrative embodiment, first edge detector module 410 evaluates the first and/or second derivatives, and compares gradient maxima or minima (from the gradient magnitude resulting from first derivative analysis) against one or more threshold values or by evaluating zero crossings from the rate of gradient change resulting from second derivative analysis. In various embodiments, first edge detector module 410 may detect zero, one, or more edges based on these evaluations of digital video signal 405. In one embodiment, first edge detector module 410 detects a set of edges based solely on an evaluation of the digital video input signal 405. It should be appreciated that in other embodiments, the first edge detector module 410 may detect a set of edges based additionally on an analysis of macroblock or other information embedded into or associated with the digital video signal 405.

In accordance with one embodiment, second edge detector module 415 also receives the digital video signal 405 and independently identifies at least one additional edge in the image that is not identified by first edge detector module 410. This additional edge is referred to herein as a first additional edge and is not part of the set of edges detected by first edge detector module 410. This is because, for example, the first edge detector may be incapable of detecting certain edges, such as edges with a particular pattern of component values. In this embodiment, second edge detector module 415, which operates independently of first edge detector module 410, contains different evaluation criteria, such as different pixel masks or different threshold values for maxima and minima first derivative gradient values enabling it to detect edges not detected by the first edge detector module 410.

For example, in accordance with the present invention, when a pixel is evaluated to determine its status, such as that of an image edge or block boundary for example, a gradient value corresponding to that pixel is evaluated in relation to the gradient values of its neighbors. The result in this example is a 3×3 image pixel table shown below, where R1, R2, and R3 are rows 1-3 and C1, C2, and C3 are columns 1-3 respectively. In various embodiments first and second image pixel tables represent, for example luminance (Y) or chrominance (U or V) component values of the image pixels.

First image pixel table

|    | C1 | C2  | C3  |
|----|----|-----|-----|
| R1 | 0  | 100 | 100 |
| R2 | 0  | 100 | 100 |
| R3 | 0  | 100 | 100 |

In the embodiment depicted in the table above, the pixel located at R2, C2 and with a component value of 100 is being evaluated relative to the eight adjacent pixels, which in this example have values of either 0 or 100. Because the pixels in C1 all have a value of zero and the pixels of C2 all have a value of 100 it is appreciated from the image pixel table in this example that an edge exists between the pixels of columns C1 and C2. In various embodiments this edge is identified by first edge detector module 410, second edge detector module 415, or both. Continuing with this example, an illustrative first edge detector mask (M1) which corresponds to a Sobel edge detection mask is depicted in the table below:

First edge detector mask (M1)

|    | C1 | C2 | C3 |
|----|----|----|----|
| R1 | 1  | 0  | −1 |
| R2 | 2  | 0  | −2 |
| R3 | 1  | 0  | −1 |

In this example, each pixel from the above pixel image table is convolved with its corresponding coefficient in the first edge detector mask. In other words in one embodiment each of the nine pixel values (R1C1, R1C2, R1C3, R2C1, etc.) of the image pixel table are multiplied by the mask coefficient value in the corresponding position (R1C1, R1C2, etc.) of the first edge detector mask (e.g. R1C1 of image pixel table is zero, and R1C1 of first edge detector mask is 1, and zero convolved with 1 is zero). In this illustrative example, convolving each pixel with its corresponding edge detector mask value yields the following result:

First edge detector result (from first image pixel table)

|    | C1 | C2 | C3   |
|----|----|----|------|
| R1 | 0  | 0  | −100 |
| R2 | 0  | 0  | −200 |
| R3 | 0  | 0  | −100 |

Summing the resulting values of this example gives a first edge detector result of (−400). If for example the edge threshold value is "X", the edge strength of pixel R2C2 is the absolute value of −400/X.

Continuing with this illustrative example, second edge detector mask (M2) can appear as:

Second edge detector mask (M2)

|    | C1 | C2 | C3 |
|----|----|----|----|
| R1 | 1  | −2 | 1  |
| R2 | 2  | −4 | 2  |
| R3 | 1  | −2 | 1  |

In this case, convolving the pixel image table shown above to determine if pixel R2C2 is an edge gives the second edge detector result shown below:

Second edge detector result

|    | C1 | C2   | C3  |
|----|----|------|-----|
| R1 | 0  | −200 | 100 |
| R2 | 0  | −400 | 200 |
| R3 | 0  | −200 | 100 |

Summing the resulting values here gives a second edge detector result of (−400), which is the same as the first edge detector result. If for example the edge threshold value is "X", the edge strength of pixel R2C2 is the absolute value of −400/X. In accordance with an embodiment of the present invention, the threshold value of second edge detector module 415 may be different than that of first edge detector module 410. For example, the threshold value of second edge detector mask may be "2X" where that of first edge detector mask is "X". In this embodiment, if for example the edge threshold value is "2X", then the edge "strength" of pixel R2C2 would be the absolute value of −400/2X=200/X. In this example, first edge detector module 410 may indicate that pixel R2C2 forms part of a more pronounced edge than is indicated by second edge detector module 415, although both edge detectors, applying different masks, have detected the edge at pixel R2C2.

However, continuing with this example, a different pixel image pattern representative of an edge taken from a different part of the same image may be pathologically missed by first edge detector module 410 while being detected by second edge detector module 415. For example, given the second image pixel table below, where pixel R5C5 is evaluated.

Second image pixel table

|    | C4 | C5  | C6 |
|----|----|-----|----|
| R4 | 0  | 100 | 0  |
| R5 | 0  | 100 | 0  |
| R6 | 0  | 100 | 0  |

In this example, the first and second image pixel tables may represent different portions of the same image, and the pixel values contained therein are evaluated by the same first and second edge detector modules 410 and 415 using the same masks (M1, M2) previously described. In this example, the second image pixel table indicates that pixel R5C5 represents an edge between the pixels of column C4 and those of C6. As is demonstrated below, first edge detector module 410 is incapable of detecting this edge pattern, while second edge detector module 415 does detect an edge associated with pixel R5C5.

Continuing with this example, the pixel values of the second image pixel table are convolved with the first edge detector mask below:

First edge detector mask (M1)

|    | C4 | C5 | C6 |
|----|----|----|----|
| R4 | 1  | 0  | −1 |
| R5 | 2  | 0  | −2 |
| R6 | 1  | 0  | −1 |

This results in the following:

First edge detector result (from second image pixel table)

|    | C4 | C5 | C6 |
|----|----|----|----|
| R4 | 0  | 0  | 0  |
| R5 | 0  | 0  | 0  |
| R6 | 0  | 0  | 0  |

Summing the resulting values in this example gives a first edge detector module 410 result of zero when evaluating pixel R5C5. If for example the edge threshold value is "X", the edge strength of pixel R5C5 is the absolute value of 0/X=0. In other words first edge detector module 410 fails to detect an edge at R5C5 in this example.

However, if the pixel values of the second image pixel table are convolved with the second edge detector mask below:

Second edge detector mask

|    | C4 | C5 | C6 |
|----|----|----|----|
| R4 | 1  | −2 | 1  |
| R5 | 2  | −4 | 2  |
| R6 | 1  | −2 | 1  |

This results in the following:

Second edge detector result (from second image pixel table)

|    | C4 | C5   | C6 |
|----|----|------|----|
| R4 | 0  | −200 | 0  |
| R5 | 0  | −400 | 0  |
| R6 | 0  | −200 | 0  |

Summing the resulting values here gives a second edge detector module 415 result of −800 when evaluating pixel R5C5. As the threshold value used with second edge detector module in this example is 2X, the edge strength at pixel R5C5 is represented as the absolute value of −800/2X=400/X. This illustrative embodiment generally depicts first edge detecting module 410 detecting a set of edges, (i.e. the edge at R2C2) and second edge detecting module 415 detecting at least one additional edge that was not detected by first edge detecting module 410 (i.e. the edge at R5C5). In this illustrative example, the image pixel magnitude difference between the pixel values of first and second pixel tables is the same (a difference between 0 and 100). Advantageously second edge detector module 415 in this example indicates that the edge at R5C5 has the same strength (i.e. 400/X) as the edge R2C2 as detected by first edge detector module 410. It is appreciated however that in various embodiments this situation may, but need not, occur.

In accordance with an aspect of the present invention, the second edge detector utilizes a pixel mask that is capable of identifying particular edge patterns in an image. Specifically, the second edge detector pixel mask is capable of reliably detecting an edge wherein pixel component values on either side (in the horizontal direction or in the vertical direction) of the pixel being evaluated are the same, but different from the pixel being evaluated.

It should be further appreciated that the first and second edge detector modules and thus their corresponding masks are interchangeable, and the identification of "first" and "second" throughout this disclosure is intended solely to assist in describing these elements and has no bearing on their order or function in the systems and methods described herein. Similarly the use of columns C1-C6 and rows R1-R6 is arbitrary and intended to demonstrate that in one embodiment a first pixel mask is convolved with any or all pixels forming an image and that a second pixel mask is, in this embodiment, also convolved with any or all pixels forming the same image. It is also appreciated that the mask values, threshold values, and image pixel values are exemplary and that other values may be used in various embodiments.

As previously described, in one embodiment, first edge detector 410 determines gradient maxima or minima by evaluating the first derivative of an image. First edge detector 410 may also identify zero crossings based on the second derivative of the image. In various embodiments the first and/or second derivatives of the digital video signal are analyzed by first edge detector 410 to identify a first set of edges. This may be accomplished by evaluating the first and or second derivatives, and comparing gradient maxima or minima (from the gradient magnitude resulting from first derivative analysis) against one or more threshold values or by evaluating zero crossings from the rate of gradient change resulting from second derivative analysis.

The second edge detector module 415 detects at least one additional edge based on an evaluation of the same digital video signal 405 which in one embodiment is received independently of first edge detector module 410. The second edge detector module 415 may, like the first edge detector module 410 also receive any data associated with the digital video signal 405, such as macroblock or other encoding information. In one embodiment, the digital video signal 405 is received in parallel by the first edge detector module 410 and the second edge detector module 415. In various embodiments second edge detector module 415 neither receives nor transmits data to or from first edge detector module 410, and logic operations are performed separately by each of first edge detector module 410 and second edge detector module 415.

In accordance with one embodiment, the first edge detector module 410 is a Sobel edge detector and the second edge detector module 415 includes what is termed herein as a comb edge detector. In various embodiments, system 400 may include a third edge detector module 420 as shown, or additional edge detectors. Generally, third edge detector module 420 is configured to receive digital video signal 405 and to independently identify at least one second additional edge in the image that is not identified by first edge detector module 410 and that is not identified by second edge detector module 415. Generally, any number of additional edge detectors (not shown) may be included within the system. These additional edge detectors are adapted to detect, independently, of the first and second edge detector modules at least one edge that can not be detected by any other edge detector module, based at least in part on an evaluation of digital video signal 405. For example, the third edge detector module 420 may detect edges based solely or in part on macroblock or other encoding information embedded in or associated with digital video signal 405.

As previously described, one embodiment of system 400 includes at least one processor 425 that may include or be associated with or part of any edge detector module, such as first edge detector module 410, second edge detector module 415, or third edge detector module 420. Processor 425 may also be a component of any computer, and processor 425 generally has sufficient processing power to perform the logic operations disclosed herein. Processor 425 may be a programmable general purpose Digital Signal Processor (DSP), available from companies such as Analog Devices, Motorola, or Texas Instruments, or an application specific DSP designed for a particular application and provided by a company such as Zoran Corporation. Processor 425 may be associated with a memory 407 that generally includes a combination of RAM memory and ROM memory, but may also include other types of memory, such as flash or disk-based memory, etc. In accordance with varying embodiments, the memory 407 may be adapted to store instructions to or from processor 425, as well as digital video signal 405 for access by processor 425 and the edge detector modules 410, 415, and 420.

Processor 425 generally receives digital video signal 405, the set of zero or more edges identified by first edge detector module 410, and at least one additional edge, such as the first additional edge identified by second edge detector module 415 or the second additional edge identified by third edge detector module 420. In one embodiment, processor 425 may modify visually perceptible artifacts in digital video signal 405. In this illustrative embodiment, processor 425 may make these modifications based on any of the set of zero or more edges, the first additional edge, the second additional edge, or, more generally, any edge of the image that is identified by any edge detector module as indicated by an edge map.

Processor 425 may implement the logic operations of any one or more of the edge Is detector modules. For example, for each pixel of an image, processor 425 may perform a two dimensional gradient measurement by convolving each pixel of the image with a pixel mask to determine, for example, horizontal and vertical gradient values for the luminance component, the chrominance components, or both the luminance and chrominance components of each pixel. In various embodiments, each pixel mask may be different for each edge detecting module. In other embodiments a plurality of edge detecting modules may also each utilize different thresholds. Processor 425 may perform a logic operation to compare an absolute value of each of the horizontal and/or vertical gradient values to a respective threshold. Processor 425 may identify a pixel as an edge when an absolute value of the horizontal and/or gradient value exceeds its respective threshold. The identified edge may include, for example, a horizontal edge, a vertical edge, or both horizontal and vertical edges.

In one embodiment, system 400 may include a decoder 430 from which it may receive the digital video signal, a block indicator or both. In various embodiments decoder 430 may be integrated with other components of system 400, such as processor 425 or one or more of the edge detector modules 410, 415, or 420. For example, in one embodiment, decoder 430 may be configured to provide an identifier indicative of a block boundary in the image. Based upon the block boundary indicator, the processor 425 may determine if a potential blocking artifact is present in digital video signal 405, (and therefore will appear in the corresponding image unless it is removed), based on component values—such as gradient values—of pixels on different sides of the block boundary. The processor 425 determines whether the location of the potential blocking artifact corresponds to an edge in the edge map. In one embodiment, this correspondence is based on the distance between the potential blocking artifact and the nearest edge in the edge map. If an edge and a potential blocking artifact are located in the same or substantially in the same area, for example within a predetermined number of pixels of each other, processor 425 may determine that the potential blocking artifact is an edge that forms part of the image, and is not a compression artifact or other unwanted distortion.

Where the potential blocking artifact does not share the same or a similar location as an edge, processor 425 may determine that the potential blocking artifact is a block or other form of compression artifact that is a result of the encoding and decoding process, and not part of the original image upon which digital video signal 405 is based. In this example, the use of at least one filter 435 generally improves image quality by removing unwanted artifacts that alter the visual perception of the image, or by enhancing the image to improve its visual perception. Generally, once artifacts or any other unwanted image distortions are identified in the input image, filters 435 are applied to remove them from the image or to reduce their objectionable visual appearance. Filter 435 generally operates on block boundaries and edge regions of the image. In one embodiment, filter 435 smoothes block boundaries, sharpens edge regions, and reduces noise, and various filters 435 may or may not rely at least in part on macroblock information. Filters 435 may operate on either chrominance or luminance components, or both, of an image. In one illustrative embodiment, filters 435 directed towards ringing and edge noise operate on both the chrominance (U and V) and luminance (Y) channels, and filters 435 directed towards blocking artifacts are applied to the luminance channel only.

In general, processor 425 processes the digital video signal to modify visually perceptible artifacts in the image, such as edges and block boundaries for example, based at least in part on edge locations contained in the edge map. In one embodiment, filter 435 is directed by processor 425 to make these modifications to the image. Various embodiments may include more than one filter 435. For example, in one embodiment, filter 435 includes a vertical deblocking filter to filter vertical block artifacts, a horizontal deblocking filter to filter horizontal block artifacts, and a deringing filter to filter ringing noise.

In accordance with one embodiment, system 400 may further include a display unit 440, such as a computer monitor, television monitor, Personal Digital Assistant (PDA) display screen, mobile telephone display screen, digital frame, or other visualization device capable of displaying a digital image. For example, a digital image can be produced on display unit 440 after filter 435 has operated in conjunction with processor 425 to modify visually perceptible artifacts in the image. As a result, the reproduced image displayed on display unit 435 more closely resembles the original image.

As previously described, edge detection generally assists in the processing of digital video signal 405 to determine where and how to modify visually perceptible distortions appearing in the image. Sobel, Laplace, and other operators may fail to detect edges in certain pathological patters existing in the digital video signal. Embodiments of the invention utilize an independent additional edge detector or edge detecting process to identify additional edges in the image that, for example, are not capable of being identified by conventional Sobel or Laplace type operators.

Applicants have determined that line doubling associated with an interlaced digital video signal 405, or other forms of high resolution processing may complicate the detection of vertical blocking artifacts. For this reason, in one embodiment, the detection of vertical block boundaries is decoupled from the detection of horizontal block boundary distortions. Furthermore, in this embodiment, two different error correction techniques, such as the use of different filters 435, are applied to any detected vertical or horizontal block boundaries. Further details of edge detection, artifact detection, and filtering are now described in more detail with respect to FIGS. 5-8.

Figure 5:
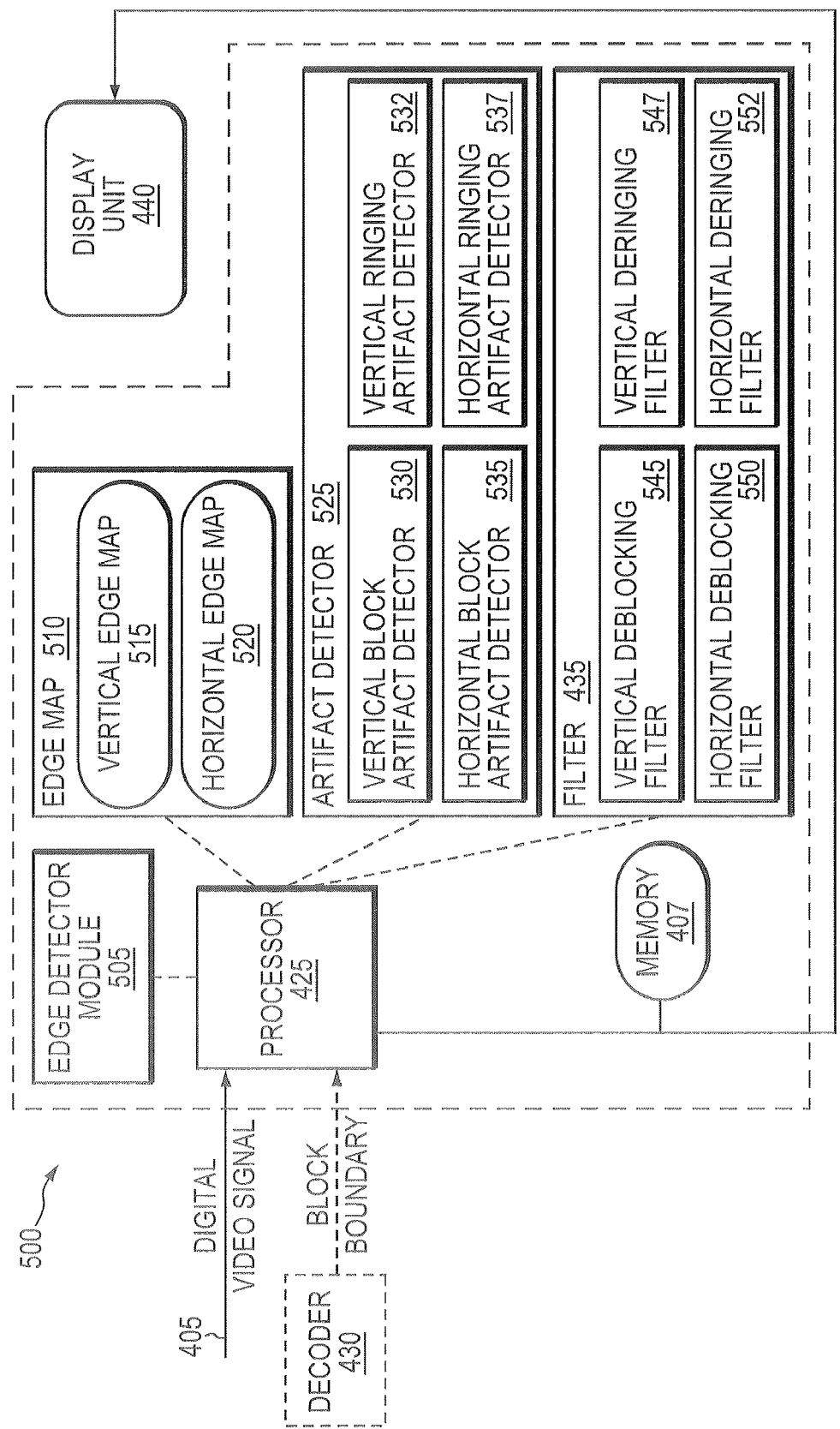
FIG. 5 is a block diagram depicting a system for edge detection in accordance with an embodiment of the invention.

FIG. 5 is a functional block diagram depicting a system 500 for edge detection in accordance with an embodiment of the invention. Edge detector 505 includes a first edge detector module 410 and a second edge detector module 415, and may optionally include a third edge detector module 420, or any additional edge detector modules as previously described.

Edge detector 505 generally performs a two dimensional (2D) gradient measurement on an image and detects regions of high spatial frequency that correspond to edges in the image that corresponds to digital video signal 405. In one embodiment, edge detector 505 convolves each pixel of the input image represented by digital video signal 405 separately with at least one mask. In accordance with an aspect of the present invention, the first and second edge detector modules 410 and 415 operate independently of each other. In one embodiment, first edge detector module 410 includes a Sobel edge detector that performs a 2D gradient measurement on digital video signal 405 and detects regions of high spatial frequency that correspond to a set of edges. First edge detector module 410 convolves each image pixel component value, (e.g., U, V, and Y) with the following masks to produce separate measurements of the gradient component in each orientation, such as horizontal ($G_X$) and vertical ($G_Y$):

| $G_X$: | | |
|---|---|---|
| −1 | 0 | +1 |
| −2 | 0 | +2 |
| −1 | 0 | +1 |

| $G_Y$: | | |
|---|---|---|
| +1 | +2 | +1 |
| 0 | 0 | 0 |
| −1 | −2 | −1 |

Convolving each image pixel with the mask above results in measurements of gradient components in the horizontal ($G_X$) and vertical ($G_Y$) directions that correspond to edge locations in digital video signal 405 detected by first edge detector 410. These gradient components are compared to a respective threshold by the first edge detector module 410 to determine whether they correspond to edges.

Another edge detector 505, such as second edge detector module 415 operating independently of first edge detector module 410 detects at least one additional edge not detected by first edge detector module 410. Second edge detector module 415 for example also performs a 2D gradient measurement on digital video signal 405 and also detects regions of high spatial frequency, but which correspond to at least one additional edge not included in the set of edges detected by first edge detector module 410. Second edge detector module 415 may include masks that are convolved with each image pixel component value (e.g. U,V, and Y) of digital video signal 405 separately. Examples of the masks that may be used by second edge detector module 415 are as follows:

| $G_X$: | | |
|---|---|---|
| −1 | +2 | −1 |
| −2 | +4 | −2 |
| −1 | +2 | −1 |

| $G_Y$: | | |
|---|---|---|
| −1 | −2 | −1 |
| +2 | +4 | +2 |
| −1 | −2 | −1 |

Convolving the pixel component values with these second edge detector module 415 masks generally identifies at least one edge. This may include at least one edge that was not identified by the first edge detector module 410 mask combination. As a result, additional edges may be identified that are missed by first edge detector module 410 and its corresponding masks. This additional edge or edges, along with all edges identified by first edge detector module 410 may be combined into edge map 510, where they may be used for further processing of digital input signal 405.

It should be apparent to those skilled in the art that the edge mask used by the second edge detector differs markedly from the more conventional edge mask used by the first edge detector. Although both masks yield a gradient value of zero when all 8 pixels surrounding the reference pixel have the same value, the second edge mask is capable of detecting edges where the pixel component values on either side of the reference pixel, either in the horizontal or the vertical direction are the same, but differ from that of the reference pixel. Indeed, in contrast to the Sobel operator-based edge mask used by the first edge detector, the comb edge mask used by the second edge detector is symmetric across its main diagonals. It should be appreciated that the actual values of mask coefficients need not be as shown, as they may be multiplied by a constant (e.g., "x" in the tables below) and still achieve the same result. For example, a more general form of the pixel mask used by the second edge detector may be shown as

| $G_X$: | | |
|---|---|---|
| −x | 2x | −x |
| −2x | 4x | −2x |
| −x | 2x | −1 |

| $G_Y$: | | |
|---|---|---|
| −x | −2x | −x |
| +2x | +4x | +2x |
| −x | −2x | −x | where "x" may be any constant other than zero.

System 500 also typically includes at least one edge map 510. Edge map 510 generally includes all detected edges, detected by any or all of the plurality of edge detectors 505 and includes location related information sufficient to identify the location of all identified edges in the image. In one embodiment, edge map 510 includes a vertical edge map 515 and a horizontal edge map 520 corresponding to edges identified any of the pixel component values (e.g. U, V, Y), although it should be appreciated that separate horizontal and vertical edge maps for each component could alternatively be provided. As indicated by their names, vertical edge map 515 includes the location of all vertical edges (for any of the components) identified in the image by any edge detector 505, and horizontal edge map 520 includes the location of all horizontal edges identified in the image by any edge detector 505. Is In various embodiments other edge orientations are possible.

In one embodiment, edge map 510 is used in conjunction with at least one artifact detector 525 to identify visually perceptible artifacts in the image that are to be modified. Artifact detector 525 may be associated with or integral to processor 425, and artifact detector 525 may include at least one vertical block artifact detector 530, at least one horizontal block artifact detector 535, at least one vertical ringing artifact detector 532, and at least one horizontal ringing artifact detector 537. As their names imply, vertical artifact detector 530 is used to identify vertical artifacts, such as vertical block artifacts to be smoothed, horizontal artifact detector 535 identifies horizontal artifacts, such as horizontal block artifacts to be smoothed, and horizontal and vertical ringing artifact detectors 532 and 537 identify ringing or other edge noise to be removed to sharpen edges of the image.

Artifact detector 525 generally tests for discontinuities at compression block boundaries that may not correspond to edges in the image as well as ringing or edge noise. For example, these discontinuities can constitute compression coding artifacts that should be corrected to avoid visual degradation of the image. Generally, to determine whether an artifact is present, artifact detector 525 gathers information from the edge detector 505, described above, as well as the location of a compression block boundary. In various embodiments artifact detection may be done in either or both of the vertical or horizontal directions. In one illustrative embodiment, artifact detector 525 may utilize only the luminance component of digital video signal 405 to detect block artifacts.

The following example relates to the horizontal dimension of the image; however analogous processing generally may be applied to the vertical dimension or dimensions of other orientations. The blocks in Table I below (denoted by bold lines) generally represent discrete cosine transform blocks, although other transforms may be used in various embodiments. Each non-bolded and smaller block generally represents a pixel in the image. Is In this block boundary determination example, pixels h, i, j, and k are consecutive pixels across a compression block boundary as are pixels a, b, c, and d, as indicated in the table below. In other words the horizontal compression block boundary is the line between the third and fourth columns of the table. Therefore pixels i and j are the pixels immediately to the left and right, respectively, of the block boundary, as shown below.

TABLE I

Block (n)   Block (n + 1)

In Table I, block (n) is the block including pixels "h" and "i", and block (n+1) is the block containing pixels j, k, c, and d. In this example and with respect to the above table, the differences in the luminance value between the four consecutive pixels h, i, j, and k may be calculated as indicated below:

$$\Delta_n = \text{abs}(i-h);$$

$$\Delta_{bn} = \text{abs}(j-i);$$

$$\Delta_{n+1} = \text{abs}(k-j);$$

where $\Delta_{bn}$ is the luminance difference between the pixels across the block boundary, while $\Delta_n$ and $\Delta_{n+1}$ are luminance differences between pixels within blocks (n) and (n+1), respectively. It should be appreciated that the determination of blocking artifacts may also be performed for the other pixel component values, (i.e., other than luminance) although human perception is less sensitive to chrominance variations than luminance variations.

To detect a potential blocking artifact, artifact detector 525 determines that a discontinuity greater than a certain threshold in the pixel component values on either side of the block boundary exists, and second, that the difference between pixel component values within each block adjacent to the boundary is smaller than a certain proportion of the inter-block discontinuity, indicating relative inactivity within each block, but a comparatively large difference at the block boundary. Where this condition exists, the discontinuity is determined to be a potential blocking artifact.

In accordance with one aspect of the present invention, a potential blocking artifact, $B_p$, is detected when the following equation is satisfied:

$$B_p = (\Delta_{bn} > Th_{blk}) \text{ AND } (\Delta_n < (P_{blk} * \Delta_{bn})) \text{ AND } (\Delta_{n+1} < (P_{blk} * \Delta_{bn}));$$

where $Th_{blk}$ is a threshold above which the discontinuity across the block boundary may be objectionable, and $P_{blk}$ is a constant representing the comparative proportion of the boundary discontinuity that is allowable with respect to the intra-block pixel activity. In one embodiment these constants are programmable under software control allowing parametric adjustment of the algorithm's sensitivity.

In one embodiment, edge map 510 is consulted to determine if the potential blocking artifact is an actual block (or other) artifact. If no edge was detected in this region, the potential blocking artifact is declared to be an actual artifact, $B_a$, and correction for this region is indicated. Stated logically:

$B_a = B_p$ AND /Edge; where /Edge indicates no edge detected in the region.

When detecting edges and potential blocking artifacts, it should be appreciated that in some embodiments block boundaries do not correspond to the outer boundaries of the image. In other words the outer boundaries of the image are not necessarily block boundaries, and blocks can be cut off prematurely at an image boundary. For example if an image is 11 pixels across and the pixel blocks are 8×8 pixels, one full block can exist (eight pixels across) with another partial pixel block being only three pixels across.

With reference to Table I and wherein block (n) includes, for example, only a portion of an 8×8 pixel block at or near the outer boundary of the image, when evaluating video signal 405 pixel by pixel from left to right to identify a horizontal blocking artifact, pixel h component values would be the first values evaluated and would be evaluated before the first block boundary has been reached. In this illustrative example, where pixel h is the first pixel evaluated and is not adjacent to a block boundary, a determination can be made that no blocking artifact exists with respect to pixel h and in this example pixel h component values would not be filtered and a subsequent pixel would then be evaluated.

Alternatively, and with respect to Table I, where pixel i borders a block boundary, but is the first pixel whose component values are evaluated (e.g., is the leftmost pixel in that row of the image), then the component values of pixel i cannot be compared to component values of a prior pixel as the prior pixel in this example does not exist. To account for such an occurrence, in one embodiment $\Delta_n$, which equals the absolute value of pixel i minus a prior pixel (e.g., pixel h,) can be set to zero, thereby avoiding detection of a potential blocking artifact.

It should be appreciated that an analogous situation may occur with respect to determination of horizontal blocking artifacts when the systems and methods disclosed herein sweep from right to left as depicted in Table I and evaluate pixel components that form part of an incomplete block at the end of an image. For example if a last pixel evaluated (e.g., pixel h) is not adjacent to a block boundary and the image ends before the end of the block (along with its block boundary) to which pixel h belongs would otherwise be found, then no blocking artifact is detected and no filtering occurs. In another embodiment where the last pixel whose component values are evaluated in a right to left sweep is adjacent to a block boundary on one side and adjacent to the end of the image on the other side, $\Delta_{n+1}$ can be set to zero when evaluating $B_p$ to similarly avoid detection of a potential blocking artifact.

It should be further appreciated that analogous situations may occur with regard to pixel component evaluation at or near the ends of the image to determine vertical blocking artifacts. For example, some pixels can be part of a pixel block that is incomplete or partial because the block has been cut off by the outer boundary of the image so that at least one block boundary of that incomplete block would, if it were a complete block, lie outside the outer boundary of the image. In these incomplete blocks, pixels that are not adjacent to a block boundary that is within the image (i.e., a block boundary that has not been cut off) can be determined not to include vertical blocking artifacts. Similarly, pixels in these incomplete blocks that are adjacent to a block boundary that is within the image can have intrablock component values $\Delta_n$ or $\Delta_{n+1}$ zeroed out when evaluating $B_p$. In further embodiments it should also be appreciated that the last pixel component values evaluated in a vertical direction after the last block boundary in the image, where the image ends before the end of the block to which the last pixel belongs are also processed in an analogous fashion as compared to their respective horizontal pixels, as described above.

Figure 7:
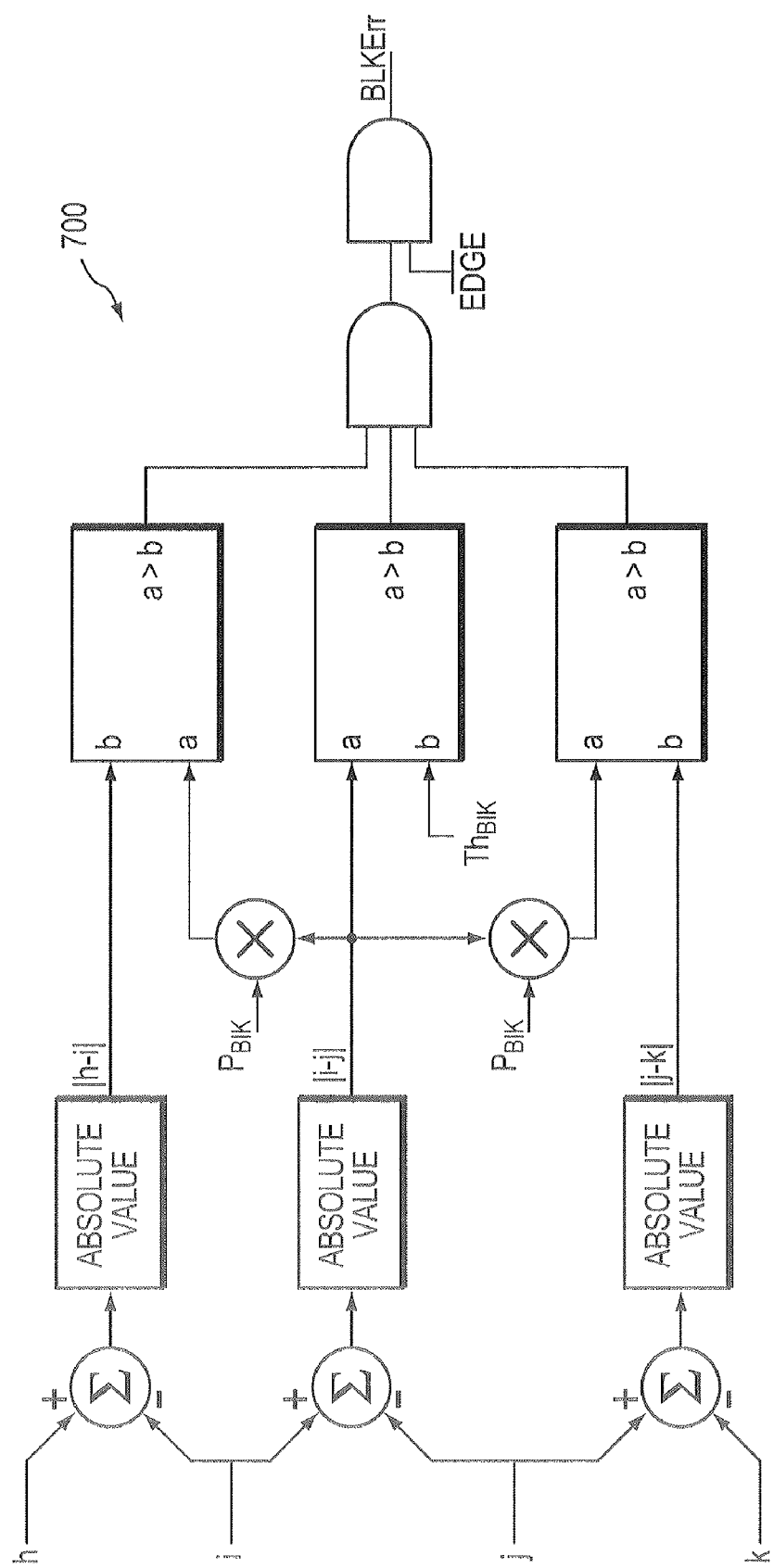
FIG. 7 is a is a logical block diagram of a blocking artifact detector in accordance with an embodiment of the invention.

FIG. 7 is a logical block diagram of a blocking artifact detector that performs the functionality described above. As depicted in FIG. 7 and with respect to Table I above, some of pixels h, i, j, and k may cross a compression block boundary. As illustrated in FIG. 7, the absolute value of the difference in component values (e.g., luminance) between pixels h, i, j, and k may be calculated. A potential block boundary artifact may be determined to exist if a difference in two pixel component values corresponding to pixels on either side of a block boundary is greater than a threshold value representing a potential block boundary artifact, and if a difference between pixel component values within each block adjacent to the boundary is smaller than a constant related to the inter-block discontinuity in component values. If a potential block boundary artifact is deemed to exist, edge map 510 can be consulted to determinatively indicate the status of the potential block boundary artifact as either an edge or as a block boundary artifact. As discussed previously, detection of vertical block artifacts may be performed in a similar manner for consecutive pixels on opposite sides of a vertical block boundary to determine whether a potential vertical block boundary artifact exists, and whether it is an actual block boundary artifact or an edge.

Ringing and edge noise may also be present and typically occur in the vicinity of edges in the image. Edges generally are characterized by relatively large amounts of energy at high frequencies in a compression block. Because of the quantization of the frequency components in the compression process, information may be lost while decompressing the image, resulting in spatial ambiguity of the edge information (ringing) as well as noise or other artifacts in the decompressed image.

In one embodiment, ringing artifacts are detected based upon an evaluation of the number of edges detected in the vicinity of a given pixel. The number of edges includes both horizontal and vertical edges for any of the component values. Where the number of detected edges in the vicinity of a given pixel is less than a threshold value, the region in the vicinity of that pixel may be flagged as warranting filtration to remove the ringing and noise. Conversely, for example, if the number of edges detected exceeds the threshold value, the region in the vicinity of that pixel is not flagged for filtering, to maintain the sharpness of the edges within that region.

In one illustrative embodiment, the number of edges discovered in an N×N region surrounding a current pixel under evaluation is computed for both the vertical dimension and the horizontal dimension. These are designated $N_v$ and $N_h$, respectively. In this illustrative embodiment, vertical ringing, $R_v$, and horizontal ringing, $R_h$ are detected, for example, when:

$$R_v = N_v < Th_{rv} \text{ AND /Edge.}$$

$$R_h = N_h < Th_{rh} \text{ AND /Edge.}$$

Where $Th_{rv}$ and $Th_{rh}$ are programmable thresholds, and /Edge is a signal indicating that the pixel under evaluation is not itself an edge.

In one embodiment, artifact detector 525 identifies at least one block boundary in digital video signal 405 and determines if a potential blocking artifact is present in digital video signal 405. If the location of the potential blocking artifact corresponds to an edge location as indicated by edge map 510, artifact detector 525 may identify that this potential blocking artifact is not an actual blocking artifact but an edge. Alternatively, if the location of the potential blocking artifact does not correspond to an edge location as indicated by edge map 510, artifact detector 525 can determine that the potential blocking artifact is an actual blocking artifact, and this actual blocking artifact can be filtered by filter 435 to modify the image. Artifact detector 525 may also detect ringing or other edge noise based upon the number of edges in a vicinity of a respective pixel. Where the artifact detector 525 determines that the number of edges in the vicinity is less than a programmable threshold and that respective pixel is not itself an edge pixel, then ringing or other edge noise may be determined to be present, and appropriately filtered by filter 435.

In accordance with a further aspect of the present invention, and as described in more detail further below, filtering for ringing and other edge noise may be performed only when it is determined that pixel being evaluated corresponds to a block of pixels in which at least one edge is present to reduce the possibility of blurring the image in those blocks in which no edges are present, as well as to reduce processing requirements.

Filter 435 in one embodiment removes unwanted artifacts, such as block artifacts or ringing noise from digital video signal 405 so that these artifacts do not appear in the image. In various embodiments, filter 435 is associated with or integral to processor 425, and can include at least one vertical deblocking filter 545 for filtering vertical block artifacts, at least one horizontal deblocking filter 550 for filtering horizontal block artifacts, at least one vertical deringing filter 547 for filtering vertical ringing noise or artifacts, and at least one horizontal deringing filter 552 for filtering horizontal ringing noise or artifacts.

In general, artifacts that are identified in digital video signal 405 may be filtered to reduce their objectionable visual appearance. In one embodiment, both the chrominance (U, V) and luminance (Y) channels are corrected for ringing and edge noise by vertical or horizontal deringing filters 547 and 552, but in this embodiment, the vertical deblocking filter 545 and the horizontal deblocking filter 550 are applied only to the luminance component due to the recognition that human perception is more sensitive to blockiness in the luminance component than the chrominance components.

Vertical deblocking filter 545 receives output from vertical artifact detector 530 and, if a vertical block artifact has been determined to exist, generally reduces block artifacts across vertical compression block boundaries. With reference to Table I, (reproduced below), pixels a, b, c, and d cross a vertical compression block boundary where the boundary exists between pixels "b" and "c".

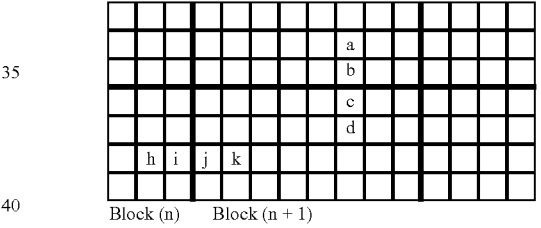

Block (n)    Block (n + 1)

In accordance with one embodiment, the following filters may be applied to the luminance component of pixels a, b, c, and d. First, let x=c−b for the pixels where vertical artifact detector 530 detects an artifact, $$a' = a + x/8$$

$$b' = b + x/2$$

$$c' = c - x/2$$

$$d' = d - x/2$$

The filtering process in this example smoothes pixels a, b, c, and d (the four pixels spanning the compression block boundary), based on the luminance difference between pixels c and b (the pixels immediately adjacent to the block boundary) and uses instead the values a', b', c', and d' for these pixels.

In accordance with a further embodiment, the subject pixels a, b, c, and d can be further smoothed by applying, for example, a 1-2-1 Finite Impulse Response (FIR) filter as described below:

$$a\_out = (a' + 2a' + b' + 2)/4$$

$$b\_out = (a' + 2b' + c' + 2)/4$$

$$c\_out = (b' + 2c' + d' + 2)/4$$

$$d\_out = (c' + 2d' + d' + 2)/4$$

The output of the FIR filter (a_out, b_out, c_out, and d_out) may then be used instead of the prior luminance values of a, b, c, and d, respectively. This processing of digital video signal 405 generally results in a modification of a visually perceptible artifact in the image as depicted by display unit 440. In various embodiments, an Infinite Impulse Response or other type of filter may also be used.

Figure 8:
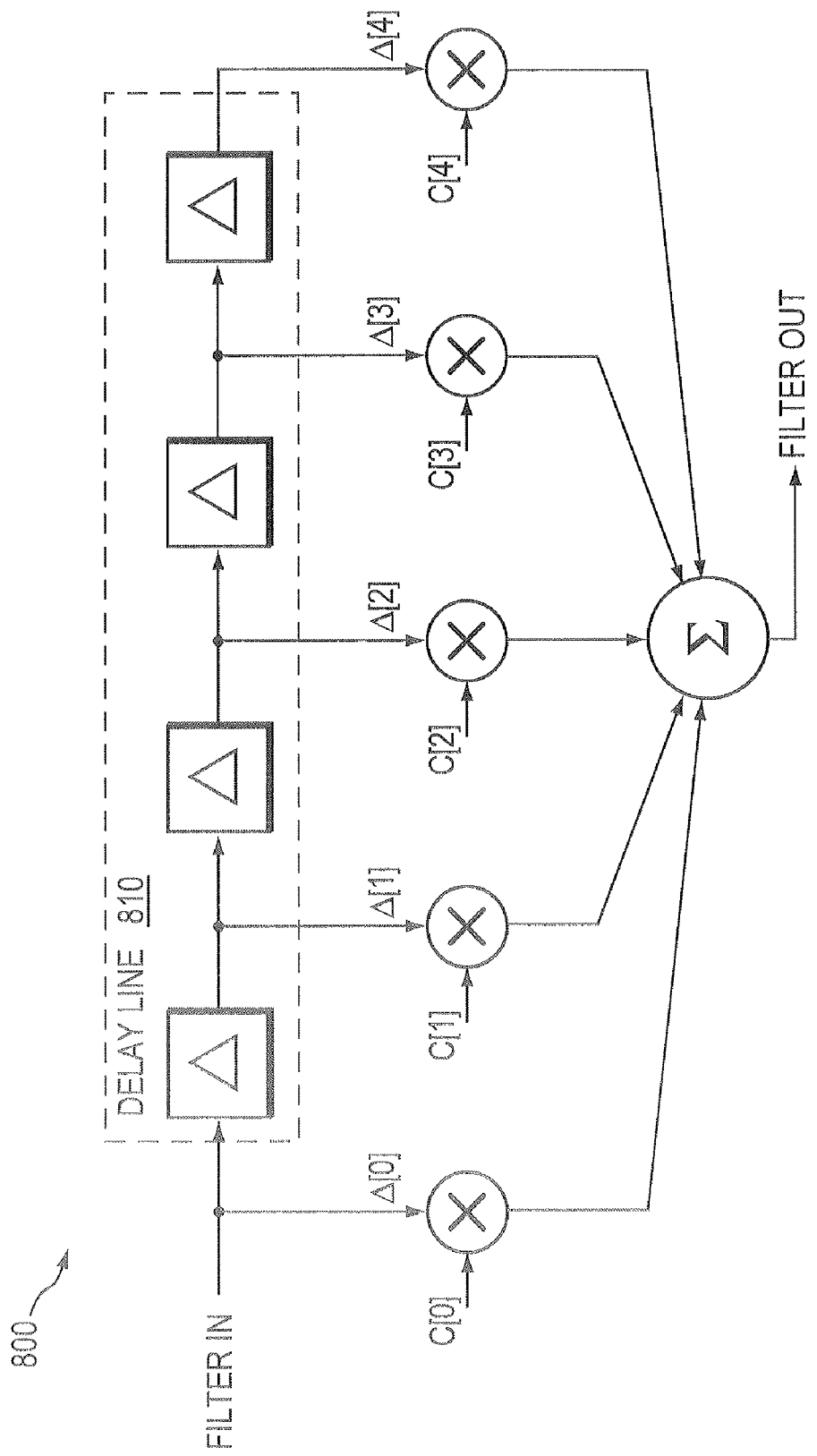
FIG. 8 is a functional block diagram of a filter in accordance with an embodiment of the invention.

FIG. 8 is a functional block diagram of a filter 800 in which horizontal block artifact filtering may be performed. In one illustrative embodiment, filter 800 includes a fifth order (i.e., five tap) Finite Impulse Response (FIR) filter. As illustrated, filter 800 includes a four element delay line 810 where central tap A[2] includes a reference pixel from the following coefficient table, Table II:

TABLE II

Five tap FIR Filter coefficient table

| Reference pixel | Coefficients C[0], C[1], C[2], C[3], C[4] |
|---|---|
| h | [0, 3, 6, 4, 3]/16 |
| I or j | [3, 3, 4, 3, 3]/16 |
| k | [3, 4, 6, 3, 0]/16 |
| All other pixels | [0, 0, 1, 0, 0] |

In this illustrative embodiment, the Filter In values of FIG. 8 are received into delay line 810, multiplied by their respective coefficients (C[1] ... C[4]), and summed together to form the Filter Out value that is used instead of the luminance value of the reference pixel.

Vertical deringing filter 547 or horizontal deringing filter 552 may be used to reduce ringing or other noise present in digital video signal 405. More specifically, deringing filters 547 or 552 may perform filtering in either, both, or neither of the vertical or horizontal directions based at least in part on vertical ringing artifact detector 532 or horizontal ringing artifact detector 537. In one embodiment, vertical deringing filter 547 or horizontal deringing filter 552 may include at least one FIR filter for both luminance and chrominance filtering.

In one embodiment, vertical filtering for ringing or other noise is performed before horizontal filtering is performed. However, in other embodiments, this order may be reversed.

It should be appreciated that ringing noise may occur as a result of a decompression process applied to a compressed digital image signal, and that ringing noise is especially prevalent in high frequency digital image signals, (e.g., signals including many edges). Either vertical deringing filter 547 or horizontal deringing filter 552, when applied to pixels forming an image generally results in a smoothing of artifacts like ringing noise. However, these filters applied to all pixels of an image may smooth parts of the image where no ringing noise is present, thus degrading image quality. Although vertical deringing filters 547 or horizontal deringing filter 552 may be applied to each pixel forming the image, in one embodiment they are applied only to pixels that are located near detected edges, leaving the remaining pixels unfiltered. For example, because ringing noise occurs at or near edges, the digital image signal may be scanned to identify pixel blocks, such as 8×8 pixel blocks corresponding to previously de-compressed Discrete Cosine Transform (DCT) blocks that include detected edges. Either vertical deringing filter 547 or horizontal deringing filter 552 in this illustrative embodiment can be applied only to the pixel blocks including these detected edges. This generally filters ringing noise (i.e., mosquito noise) from the image while avoiding what may be unnecessary filtering of the remaining pixels.

The table immediately below with pixels "A", "X", and "B" illustrates an embodiment incorporating vertical filtering for ringing or edge noise:

| A |
|---|
| X |
| B |

In this illustrative embodiment "X" is the pixel being computed, "A" is the pixel one line above "X", and "B" is the pixel one line below "X". For the pixels where vertical ringing artifact detector 532 detects ringing or other noise, "$R_v$," the following filter is, in this example, applied to each of the pixel component values (e.g., U, V, Y): using a 1-2-1 FIR Filter $$X' = (A + 2X + B + 2)/4$$

Analogously, the table immediately below with pixels "C", "X", and "D" illustrates an embodiment incorporating horizontal filtering for ringing or edge noise:

| C | X | D |
|---|---|---|

In this illustrative embodiment, "X" is the pixel component value being computed, "C" is the component value of the pixel immediately on the left of "X", and "D" is the component value of the pixel immediately on the right of "X". For the pixels where the horizontal ringing artifact detector 537 detects ringing or other noise, "$R_h$", the following filter is, in this example, applied to each of the pixel component values (e.g.; U,V,Y) using a 1-2-1 FIR filter:

$$X' = (C + 2X + D + 2)/4$$

In various embodiments, vertical deringing filter 547, horizontal deringing filter 552, or both, filter horizontal, vertical, ringing or other noise from the image for both luminance and chrominance (Y, U, and V) components of the image.

As described above, and in accordance with the present invention, digital video signal 405 is processed by at least one edge detector 505 to identify a plurality of edges of various types and orientations. The location of these edges is retained in edge map 510, and this data is evaluated by at least one artifact detector 525 to determine what, if any, modifications may be made by at least one filter 435 to modify at least one visually perceptible artifact when it is reproduced by display unit 440 as an image. This image is generally the reproduced image that is reconstructed from and based on digital video signal 405.

Figure 6:
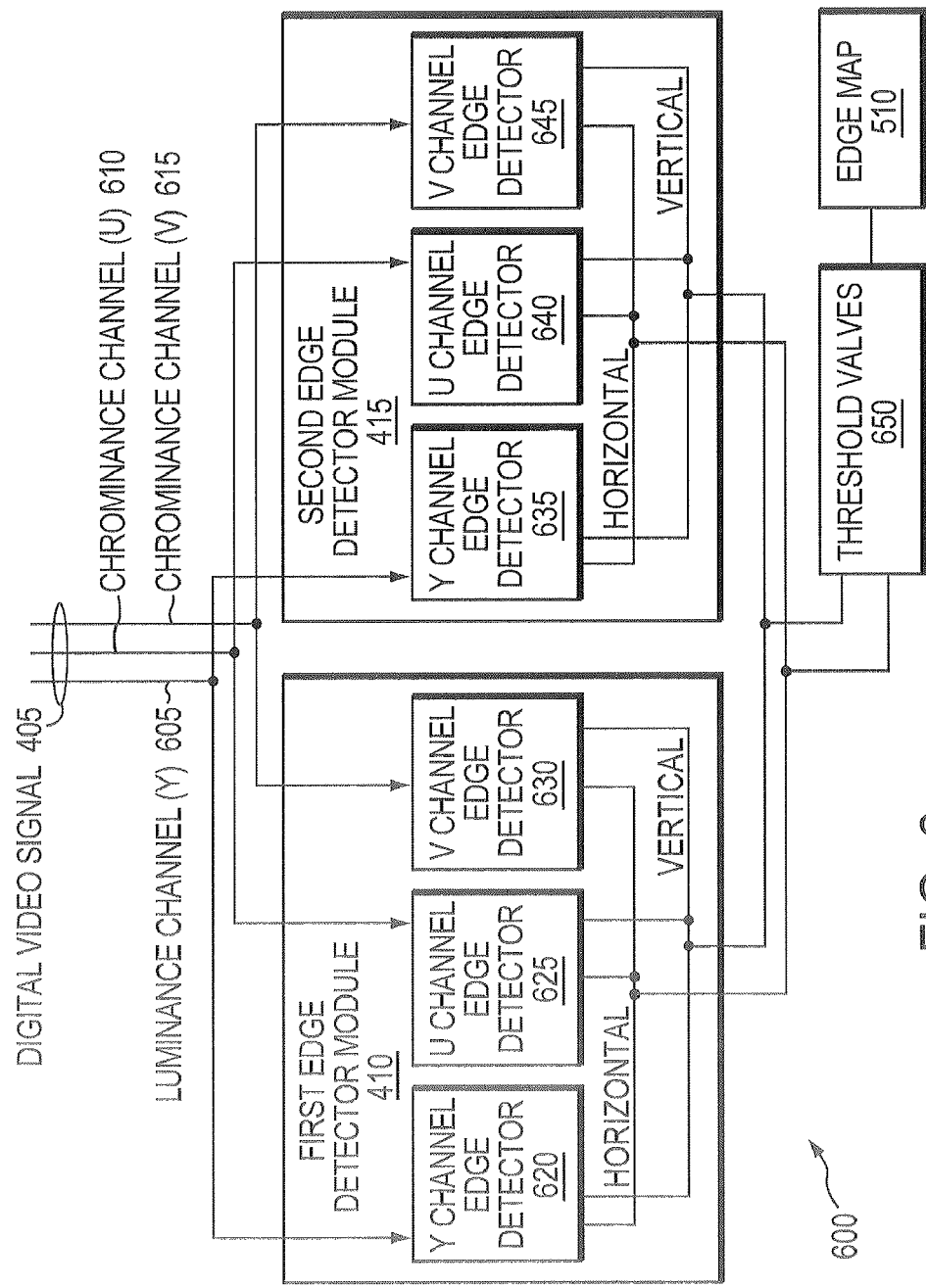
FIG. 6 is a block diagram depicting a system for edge detection in accordance with an embodiment of the invention.

FIG. 6 is a block diagram depicting a system 600 for edge detection in accordance with an embodiment of the invention that receives a digital video signal 405. Digital video signal 405 may be separated into its luminance and chrominance components, and therefore may include a luminance Y channel 605, a chrominance U channel 610, and a chrominance V channel 615. These three channels contain digital video data regarding luminance and chrominance characteristics of the pixels forming an image. Data corresponding to channels 605, 610, and 615 is provided to first edge detector module 410, which includes a first luminance Y channel edge detector module 620, a first chrominance U channel detector module 625, and a first chrominance V channel detector module 630.

As depicted, the first edge detector separately detects horizontal and vertical edges in each of the Y, U, and V components.

Data corresponding to luminance and chrominance channels 605, 610, and 615 of digital input signal 405 is also input into a second edge detector module 415, which includes a second luminance Y channel edge detector module 635, a second chrominance U channel edge detector module 640, and a second chrominance V channel detector module 645. These second luminance and chrominance edge detector modules 635, 640, and 645 of second edge detector module 415 separately detect respective luminance and chrominance edges of digital video signal 405 in both the horizontal and vertical directions.

In one embodiment, at least one threshold value 650 is applied to all edges detected by any edge detector module or component thereof. In this embodiment, the absolute value of the gradient components of each convolved pixel in each orientation, such as horizontal or vertical, is evaluated against threshold value 650. In various embodiments different threshold values 650 may apply for each gradient orientation and for each channel, such as luminance or chrominance. For example, a single horizontal luminance threshold may be evaluated against all horizontal luminance gradient values determined by first luminance Y channel edge detector module 620 of first edge detector module 410. Continuing with this example, in one embodiment the same horizontal luminance threshold may also be evaluated against all horizontal luminance gradient values determined by second Y channel edge detector module 635 of second edge detector module 415. Generally, U channel chrominance threshold values and V channel chrominance threshold values operate in an analogous manner as the luminance Y channel threshold values of this example. In one illustrative embodiment the same threshold value, (in this example a horizontal luminance threshold value) is used for both first edge detector module 410 and second edge detector module 415, (and any other edge detector module). In various embodiments, however, different threshold values may be applied independently to any edge detector module regarding any gradient orientation.

In one embodiment, to determine whether a given pixel constitutes an edge, the measurements of the gradient components of that pixel are evaluated against a threshold. For example, a horizontal edge may be detected when:

$$|Gx|_y > Th_{xy} \text{ or } |Gx|_u > Th_{xu} \text{ or } |Gx|_v > Th_{xv}.$$

Analogously, a vertical edge may be detected when:

$$|Gy|_y > Th_{yy} \text{ or } |Gy|_u > Th_{yu} \text{ or } |Gy|_v > Th_{yv}.$$

In this example, $Th_{xy}$, $Th_{xu}$, $Th_{xv}$, $Th_{yy}$, $Th_{yu}$, and $Th_{yv}$ are the software programmable thresholds where $Th_{xy}$ is a horizontal luminance (Y channel) threshold value, $Th_{xu}$ is a horizontal chrominance (U channel) threshold value, $Th_{xv}$ is a horizontal chrominance (V channel) threshold value, $Th_{yy}$ is a vertical luminance (Y channel) threshold value, $Th_{yu}$ is a vertical (U channel) chrominance threshold value, and $Th_{yv}$ is a vertical chrominance (V channel) threshold value. These threshold values are typically measured against the absolute value of the corresponding gradient component to determine whether the pixel associated with that gradient component constitutes an edge. In one embodiment, $Th_{xy} = Th_{xu} = Th_{xv}$, and/or $Th_{yy} = Th_{yu} = Th_{yv}$.

In various embodiments, the same threshold values 650 can be evaluated against gradient components resulting from operations performed by any edge detector module. For example, threshold value 650 that corresponds to the horizontal luminance (Y channel) threshold may be applied against horizontal luminance gradient values determined by first luminance Y channel edge detector module 620 of first edge detector module 410, and this same threshold value 650 may also be applied against horizontal luminance gradient values determined by second Y channel edge detector module 635 of second edge detector module 415. In other embodiments, different threshold values 650 are applied against the respective outputs of first edge detector module 410 and second edge detector module 415, or any other edge detector modules or processes. Generally, if the evaluation of component gradient absolute values against any threshold 650 indicates the existence of an edge, this data along with data corresponding to the location of the pixel corresponding to the edge is stored in edge map 510.

Note that in FIGS. 1 through 8, the enumerated items are shown as individual elements. In actual implementations of the systems and methods described herein, however, they may be inseparable components of other electronic devices such as a digital computer. Thus, actions described above may be implemented in software that may be embodied in an article of manufacture that includes a program storage medium. The program storage medium includes data signals embodied in one or more of a computer disk (magnetic, or optical (e.g., CD or DVD, or both), non-volatile memory, tape, a system memory, and a computer hard drive.

Any references to elements or acts of the systems and methods herein referred to in the singular may also embrace embodiments including a plurality of these elements, and any references in plural to any element or act herein may also embrace embodiments including only a single element. References in the singular or plural form are not intended to limit the presently disclosed systems or methods, their components, acts, or elements.

Any embodiment disclosed herein may be combined with any other embodiment, and references such as "an embodiment", "some embodiments", "an alternate embodiment", "various embodiments", or the like are not necessarily mutually exclusive. Any embodiment may be combined with any other embodiment in any manner consistent with the objects, aims, and needs disclosed herein.

From the foregoing, it will be appreciated that the digital video signal processing provided by the systems and methods described herein afford a simple and effective way to modify visually perceptible artifacts in an image. The systems and methods according to various embodiments are able to reduce block boundary distortion and ringing and other artifacts or noise. This increases efficiency and image quality, and reduces image distortion.

Those skilled in the art will realize the systems and methods described herein may be embodied in other specific forms. The foregoing embodiments are therefore to be considered in all respects illustrative rather than limiting of the described systems and methods. The scope of the systems and methods described herein is thus indicated by the appended claims, rather than the foregoing description, and all changes that come within the meaning and range of equivalency of the claims are therefore intended to be embraced therein.

What is claimed is:

1. A method of processing a digital video signal corresponding to an image, comprising acts of:
   identifying, using a first edge detecting process, a set of zero or more edges in the image based upon the digital video signal;
   identifying, using an independent second edge detecting process that is different than the first edge detecting process, at least one additional edge in the image that is not identified by the first edge detecting process;

combining the set of edges and the at least one additional edge to generate an edge map that includes the set of edges and the at least one additional edge; and processing the digital video signal to modify visually perceptible artifacts in the image based upon the edge map, wherein the digital video signal includes luminance and chrominance components for each pixel of the image, and wherein at least one of the acts of identifying includes acts of:

performing, for each pixel of the image, a 2-dimensional gradient measurement by convolving each pixel of the image with a pixel mask to determine horizontal and vertical gradient values for each luminance and chrominance component of a respective pixel;

comparing an absolute value of each of the horizontal and vertical gradient values to a respective threshold; and identifying the respective pixel as an edge when the absolute value of at least one of the horizontal and vertical gradient values exceeds the respective threshold.

2. The method of claim 1, wherein the acts of identifying the first plurality of edges and the at least one additional edge are based solely upon the digital video signal.

3. The method of claim 1, wherein the at least one additional edge is a first at least one additional edge, the method further comprising an act of:

independently identifying, using a third edge detecting process that is different than the first edge detecting process and the second edge detecting process, a second at least one additional edge in the image that is not identified by the first edge detecting process or the second edge detecting process based upon the digital video signal;

wherein the act of combining includes an act of combining the set of edges identified by the first edge detection process, the first at least one additional edge identified by the second edge detection process, and the second at least one additional edge identified by the third edge detection process to generate the edge map.

4. The method of claim 1, wherein one of the first edge detecting process and the second edge detecting process includes a Sobel edge detecting process, and wherein the other of the first edge detecting process and the second edge detecting process includes a comb edge detecting process.

5. The method of claim 1, wherein the set of edges includes both vertical and horizontal edges, and wherein the at least one additional edge includes at least one horizontal or vertical edge that is not identified by the first edge detecting process.

6. The method of claim 1, wherein set of edges includes zero edges and the at least one additional edge includes at least one of a horizontal edge and a vertical edge.

7. The method of claim 1, further comprising acts of:
determining a pixel block boundary in the image based upon component values of each pixel in the image;
determining, based upon the component values of pixels on each side of the block boundary, whether a potential blocking artifact is present in the image;
determining whether a location of the potential blocking artifact corresponds to an edge in the edge map; and
filtering the potential blocking artifact when it is determined that the potential blocking artifact does not correspond to an edge in the edge map.

8. The method of claim 1, wherein the acts of identifying the set of edges, identifying the at least one additional edge, combining the set of edges and the at least one additional edge, and processing the video signal are performed by a processor, and wherein the method is implemented in a computer program stored in a non-transitory computer readable medium and executed by the processor.

9. A method of processing a digital video signal corresponding to an image, comprising acts of:
identifying, using a first edge detecting process, a set of zero or more edges in the image based upon the digital video signal;
identifying, using an independent second edge detecting process that is different than the first edge detecting process, at least one additional edge in the image that is not identified by the first edge detecting process;
combining the set of edges and the at least one additional edge to generate an edge map that includes the set of edges and the at least one additional edge;
processing the digital video signal to modify visually perceptible artifacts in the image based upon the edge map;
receiving an identifier indicative of a block boundary in the image;
determining, based upon component values of pixels on each side of the block boundary, whether a potential blocking artifact is present in the image;
determining whether a location of the potential blocking artifact corresponds to an edge in the edge map; and
filtering the potential blocking artifact when it is determined that the potential blocking artifact does not correspond to an edge in the edge map.

10. A method of processing a digital video signal corresponding to an image, comprising acts of:
identifying, using a first edge detecting process, a set of zero or more edges in the image based upon the digital video signal;
identifying, using an independent second edge detecting process that is different than the first edge detecting process, at least one additional edge in the image that is not identified by the first edge detecting process;
combining the set of edges and the at least one additional edge to generate an edge map that includes the set of edges and the at least one additional edge;
processing the digital video signal to modify visually perceptible artifacts in the image based upon the edge map;
determining, for each pixel of the image, whether a respective pixel corresponds to an edge in the edge map;
determining, responsive to a determination that the respective pixel does not correspond to an edge in the edge map, a number of edges in a vicinity of the respective pixel; and
filtering, responsive to a determination that the number of edges in the vicinity of the respective pixel is less than a threshold number of edges, component values of the respective pixel to remove noise in the component values of the respective pixel.

11. A method of processing a digital video signal corresponding to an image, comprising acts of:
identifying, using a first edge detecting process, a set of zero or more edges in the image based upon the digital video signal;
identifying, using an independent second edge detecting process that is different than the first edge detecting process, at least one additional edge in the image that is not identified by the first edge detecting process;
combining the set of edges and the at least one additional edge to generate an edge map that includes the set of edges and the at least one additional edge;
processing the digital video signal to modify visually perceptible artifacts in the image based upon the edge map;

determining, for each pixel of the image, whether a respective pixel corresponds to a block of pixels in which at least one pixel of the block of pixels corresponds to an edge in the edge map;

determining, responsive to a determination that at least one pixel in the block of pixels corresponds to an edge in the edge map, whether the respective pixel corresponds to an edge in the edge map;

determining, responsive to a determination that the respective pixel does not correspond to an edge in the edge map, a number of edges in a vicinity of the respective pixel; and filtering, responsive to a determination that the number of edges in the vicinity of the respective pixel is less than a threshold number of edges, component values of the respective pixel to remove noise in the component values of the respective pixel.

12. A system for processing a digital video signal corresponding to an image, comprising:

a first edge detector module to receive the digital video signal and identify a set of zero or more edges in the image based upon the digital video signal;

a second edge detector module to receive the digital video signal and independently identify at least one first additional edge in the image that is not identified by the first edge detector module; and a processor configured to receive the digital video signal, the set of edges, and the at least one first additional edge and process the digital video signal to modify visually perceptible artifacts in the image based upon the set of edges and the at least one first additional edge;

wherein the digital video signal includes luminance and chrominance components for each pixel of the image, and wherein at least one of the first edge detector module and the second edge detector module identifies edges by convolving each respective pixel in the image with a pixel mask to determine horizontal and vertical gradient values for the luminance and the chrominance components of the respective pixel, comparing an absolute value of each of the horizontal and vertical gradient values to a respective threshold, and identifying that the respective pixel is an edge when the absolute value of at least one of the horizontal and vertical gradient values exceeds the respective threshold.

13. The system of claim 12, wherein the first edge detector module identifies the set of zero or more edges in the image based solely upon the digital video signal, and wherein the second edge detector module independently identifies the at least one first additional edge based solely upon the digital video signal.

14. The system if of claim 12, further comprising:

a third edge detector module to receive the digital video signal and independently identify at least one second additional edge in the image that is not identified by the first edge detector module nor by the second edge detector module;

wherein the processor is further configured to receive the digital video signal, the set of edges, the at least one first additional edge, and the at least one second additional edge and process the digital video signal to modify the visually perceptible artifacts in the image based upon the set of edges, the at least one first additional edge, and the at least one second additional edge.

15. The system of claim 12, wherein one of the first edge detector module and the second edge detector module includes a Sobel edge detector, and wherein the other of the first edge detector module and the second edge detector module includes a comb edge detector.

16. The system of claim 12, wherein the set of edges includes at least one horizontal edge and at least one vertical edge, and wherein the at least one first additional edge includes at least one first horizontal additional edge or at least one first vertical additional edge that is not identified by the first edge detector module.

17. The system of claim 12, wherein the processor is further configured to:

determine a pixel block boundary in the image based upon component values of each pixel in the image;

determine, based on the component values of pixels on each side of the block boundary, whether a potential blocking artifact is present in the image;

determine whether a location of the potential blocking artifact corresponds to an edge included in the set of edges or the at least one first additional edge; and filter the potential blocking artifact when it is determined that the potential blocking artifact does not correspond to an edge in the set of edges or the at least one first additional edge.

18. A system for processing a digital video signal corresponding to an image, comprising:

a first edge detector module to receive the digital video signal and identify a set of zero or more edges in the image based upon the digital video signal;

a second edge detector module to receive the digital video signal and independently identify at least one first additional edge in the image that is not identified by the first edge detector module; and a processor configured to:

receive the digital video signal, the set of edges, and the at least one first additional edge and process the digital video signal to modify visually perceptible artifacts in the image based upon the set of edges and the at least one first additional edge;

receive an identifier indicative of a block boundary in the image;

determine, based on component values of pixels on each side of the block boundary, whether a potential blocking artifact is present in the image;

determine whether a location of the potential blocking artifact corresponds to an edge included in the set of edges or the at least one first additional edge; and filter the potential blocking artifact when it is determined that the potential blocking artifact does not correspond to an edge in the set of edges or the at least one first additional edge.

19. A system for processing a digital video signal corresponding to an image, comprising:

a first edge detector module to receive the digital video signal and identify a set of zero or more edges in the image based upon the digital video signal;

a second edge detector module to receive the digital video signal and independently identify at least one first additional edge in the image that is not identified by the first edge detector module; and a processor configured to:

receive the digital video signal, the set of edges, and the at least one first additional edge and process the digital video signal to modify visually perceptible artifacts in the image based upon the set of edges and the at least one first additional edge;

determine, for each pixel of the image, whether a respective pixel corresponds to an edge in the set of edges or the at least one first additional edge;

determine, responsive to a determination that the respective pixel does not correspond to an edge in the set of edges or the at least one first additional edge, a number of edges in a vicinity of the respective pixel; and filter, responsive to a determination that the number of edges in the vicinity of the respective pixel is less than a threshold number of edges, component values of the respective pixel to remove noise in the component values of the respective pixel.

20. A system for processing a digital video signal corresponding to an image, comprising:
- a first edge detector module to receive the digital video signal and identify a set of zero or more edges in the image based upon the digital video signal;
- a second edge detector module to receive the digital video signal and independently identify at least one first additional edge in the image that is not identified by the first edge detector module; and
- a processor configured to:
    receive the digital video signal, the set of edges, and the at least one first additional edge and process the digital video signal to modify visually perceptible artifacts in the image based upon the set of edges and the at least one first additional edge;
    determine, for each pixel of the image, whether a respective pixel corresponds to a block of pixels in which at least one pixel of the block of pixels corresponds to an edge in the set of edges or the at least one first additional edge;
    determine, responsive to a determination that at least one pixel in the block of pixels corresponds to an edge in the set of edges or the at least one first additional edge, whether the respective pixel corresponds to an edge in the set of edges or the at least one first additional edge;
    determine, responsive to a determination that the respective pixel does not correspond to an edge in the set of edges or the at least one first additional edge, a number of edges in a vicinity of the respective pixel; and
    filter, responsive to a determination that the number of edges in the vicinity of the respective pixel is less than a threshold number of edges, component values of the respective pixel to remove noise in the component values of the respective pixel.

* * * * *